US007290068B2

(12) United States Patent
Encinas et al.

(10) Patent No.: US 7,290,068 B2
(45) Date of Patent: Oct. 30, 2007

(54) APPARATUS AND METHOD FOR WRITING INFORMATION TO A DESIGNATED INFORMATION STORAGE MEDIUM WITH AN ALLOCATED DATA STORAGE DEVICE USING A SPECIFIED INFORMATION RECORDING

(75) Inventors: Susan Encinas, Tucson, AZ (US); Daniel James Winarski, Tucson, AZ (US)

(73) Assignee: International Business Machines Corporation, New Orchard Road, NY (US)

( * ) Notice: Subject to any disclaimer, the term of this patent is extended or adjusted under 35 U.S.C. 154(b) by 69 days.

(21) Appl. No.: 10/867,858

(22) Filed: Jun. 15, 2004

(65) Prior Publication Data

US 2004/0250008 A1   Dec. 9, 2004

Related U.S. Application Data

(62) Division of application No. 10/132,592, filed on Apr. 25, 2002, now Pat. No. 6,772,272.

(51) Int. Cl.
G06F 3/00  (2006.01)
G06F 13/00 (2006.01)
G11B 13/00 (2006.01)

(52) U.S. Cl. ............... 710/16; 710/8; 710/10; 711/100; 711/111; 711/112; 711/114; 369/14; 369/30.38; 369/178.01

(58) Field of Classification Search ............. 369/14, 369/15, 30.38, 30.39, 30.4, 30.65, 30.76, 369/178.01; 713/1, 2, 100; 711/100, 111, 711/112, 114, 156; 710/8, 10, 16, 18, 19, 710/62–64, 71–74, 104; 360/131–135
See application file for complete search history.

(56) References Cited

U.S. PATENT DOCUMENTS

| 4,928,193 | A | * | 5/1990 | Agoglia et al. ......... 360/78.04 |
| 5,164,909 | A | * | 11/1992 | Leonhardt et al. ......... 700/215 |
| 5,416,914 | A | * | 5/1995 | Korngiebel et al. ........ 711/114 |
| 5,522,031 | A | * | 5/1996 | Ellis et al. .................... 714/6 |
| 5,675,586 | A | * | 10/1997 | Sako et al. .................. 714/701 |
| 5,720,029 | A | * | 2/1998 | Kern et al. ................... 714/20 |
| 5,794,244 | A | * | 8/1998 | Brosch et al. .............. 707/100 |
| 5,802,599 | A | * | 9/1998 | Cabrera et al. ............. 711/170 |
| 5,911,055 | A | * | 6/1999 | Whiteman et al. .......... 710/305 |

(Continued)

FOREIGN PATENT DOCUMENTS

EP     1 156 408 A1  *  11/2001

OTHER PUBLICATIONS

IBM Technical Disclosure Bulletin—"Logical Grouping of Data Storage Media in a Library System", Oct. 1992, vol. 35, No. 35, pp. 17-20.*

*Primary Examiner*—Tanh Q Nguyen
(74) *Attorney, Agent, or Firm*—Chandler & Udall, LLP; Dale F. Regelman

(57) ABSTRACT

A method to write information to a designated information storage medium using an allocated data storage device using a specified information recording format, whereby a previously-determined media bit for the designated information storage medium is examined, and a previously-determined device bit for the allocated data storage device is examined, and the write capability of the designated information storage medium using the specified information recording format is determined.

16 Claims, 14 Drawing Sheets

U.S. PATENT DOCUMENTS

| | | | |
|---|---|---|---|
| 6,131,129 A * | 10/2000 | Ludtke et al. | 710/5 |
| 6,327,544 B1 * | 12/2001 | Samuels | 702/70 |
| 6,328,766 B1 * | 12/2001 | Long | 710/8 |
| 6,411,571 B1 * | 6/2002 | Mitsunari et al. | 369/30.31 |
| 6,631,043 B1 * | 10/2003 | Stephens | 360/25 |
| 6,675,260 B2 * | 1/2004 | Torrey et al. | 711/114 |
| 6,748,524 B1 * | 6/2004 | Stepp et al. | 713/1 |
| 6,791,910 B1 * | 9/2004 | James et al. | 369/30.28 |
| 6,834,325 B1 * | 12/2004 | Milillo et al. | 711/113 |
| 2002/0121913 A1 * | 9/2002 | Miller et al. | 324/760 |

* cited by examiner

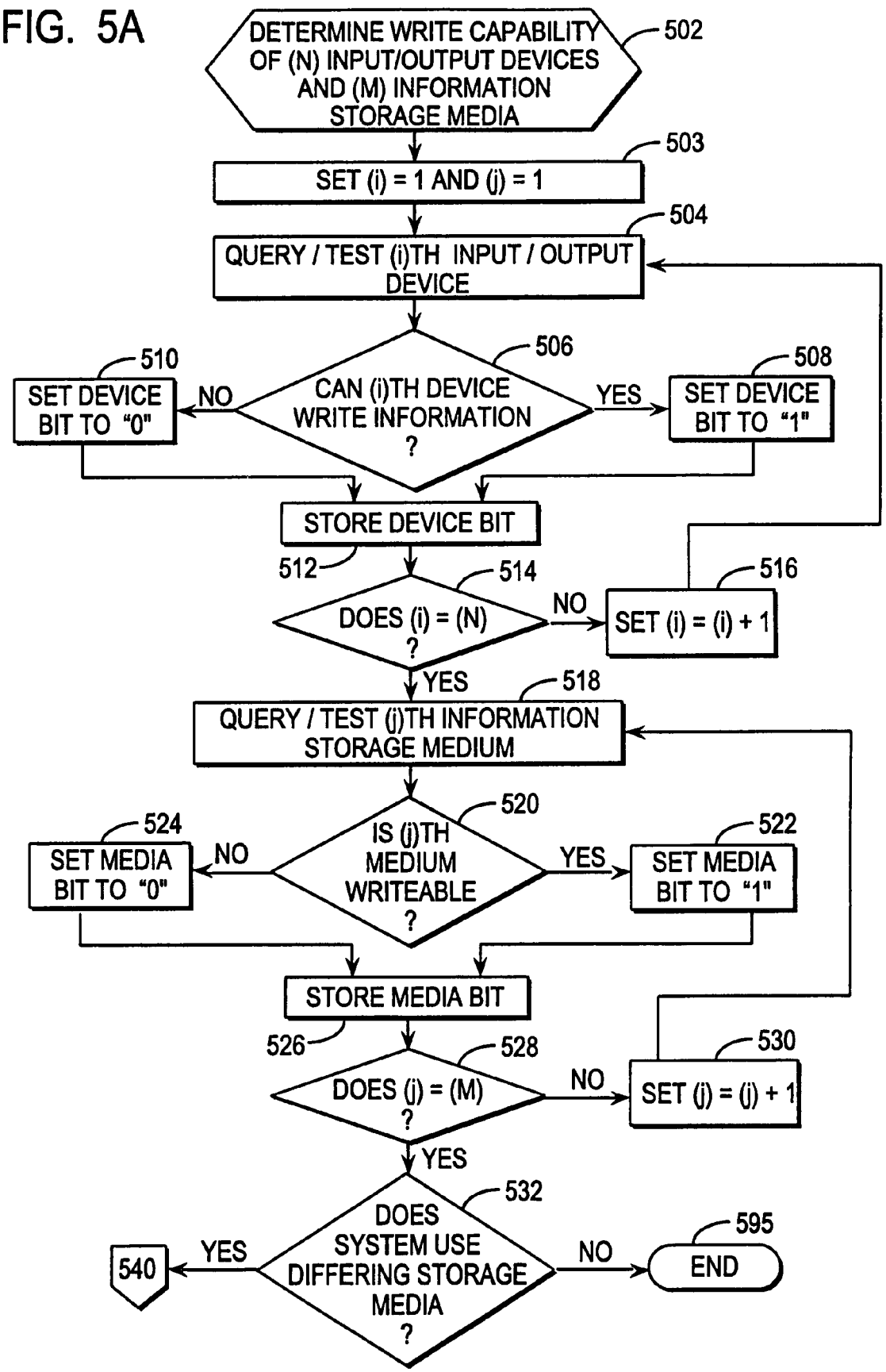

FIG. 6

| MEDIA TYPE | MEDIA CAPABILITY | BP2 | MEDIA BIT | MANAGEMENT CLASS |
|---|---|---|---|---|
| DVD - ROM | READ-ONLY | 0001b | "0"  615 | 617 |
| DVD - RAM | REWRITABLE | 0100b | "1"  625 | "RAM"  627 |
| DVD - R | WRITE ONCE | 0010b | "0" / "1"  635 | "R" "OWORM" "M/O" "PHASE CHANGE"  637 |
| DVD - RW | REWRITABLE | 0010b | "1"  645 | "M/O" "PHASE CHANGE"  647 |

| DRIVE TYPE | DRIVE CAPABILITY | DEVICE BIT |
|---|---|---|
| DVD - ROM | READ-ONLY | "0" |
| DVD - RAM | WRITEABLE | "1" |
| DVD - R | WRITEABLE | "1" |
| DVD - RW | WRITEABLE | "1" |

FIG. 8

|  | DVD-ROM MEDIA 610 | DVD-RAM MEDIA 620 | DVD-R MEDIA 630 | DVD-RW MEDIA 640 |
|---|---|---|---|---|
| DVD-ROM DEVICE 710 | 615 X 715 = 0<br>812 | 625 X 715 = 0<br>814 | 635 X 715 = 0<br>816 | 645 X 715 = 0<br>818 |
| DVD-RAM DEVICE 720 | 615 X 725 = 0<br>822 | 625 X 725 = 1<br>824 | 635 X 725 = 0 OR 1<br>826 | 645 X 725 = 1<br>828 |
| DVD-R DEVICE 730 | 615 X 735 = 0<br>832 | 625 X 735 = 1<br>834 | 635 X 735 = 0 OR 1<br>836 | 645 X 735 = 1<br>838 |
| DVD-RW DEVICE 740 | 615 X 745 = 0<br>842 | 625 X 745 = 1<br>844 | 635 X 745 = 0 OR 1<br>846 | 645 X 745 = 1<br>848 |

APPARATUS AND METHOD FOR WRITING INFORMATION TO A DESIGNATED INFORMATION STORAGE MEDIUM WITH AN ALLOCATED DATA STORAGE DEVICE USING A SPECIFIED INFORMATION RECORDING

RELATED APPLICATION

This application is a Divisional Application of the patent application having Ser. No. 10/132,592 filed on Apr. 25, 2002, now U.S. Pat. No. 6,772,272.

FIELD OF THE INVENTION

Applicant's invention relates to an apparatus and method to determine, store, access, and use, the information writing and/or reading capabilities of one or more input/output devices, one or more information storage media, and combinations thereof.

BACKGROUND OF THE INVENTION

Use of computers for both personal and business purposes requires the ability to easily and reliably store information. Many computer systems include a variety of input/output devices and a corresponding variety of information storage media. Commercially-available computer programs, and proprietary software, often display all the available input/output devices, and/or all the available information storage media, as potential write targets even though not all those available input/output devices can write information, and even though not all those available information storage media are writeable. For example, Read Only Memory ("ROM") devices cannot write information, and ROM media are not writeable. Nevertheless, such ROM devices/media are often presented as write targets. Furthermore, commercially-available computer programs, and proprietary software, often display all the available input/output devices as potential read targets even though not all those available input/output devices have information storage media mounted therein.

Many computer systems include differing types of writeable input/output devices and differing types of writeable information storage media. Thus, even if an allocated input/output device is capable of reading/writing information, and even if a designated information storage medium is writeable, the allocated device may not be able to read and/or write information from and/or to the designated information storage medium. For example, a writeable optical storage device cannot write information to a magnetic tape. As a general rule, the larger the overall size of the computer system, the more likely that system will include differing information storage devices/media. For example, an automated data storage and retrieval system may include optical information storage media/devices, magnetic information storage media/devices, and/or electronic information storage media/devices.

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a input/output device for reading and/or writing data on the accessed media. Suitable electronics operate the accessor(s) and operate the input/output device(s) to provide information to, and/or to receive information from, an attached on-line host computer system.

What is needed is an apparatus and method to determine, store, access, and use, the write capability and/or the read capability of one or more input/output devices, one or more information storage media, and optionally, combinations thereof, disposed in a computer system. Such a computer system may comprise a personal computer, a mainframe computer, a work station, a data storage and retrieval system, and combinations thereof. Such a method can be implemented in commercially-available computer programs, in proprietary software, in information storage management programs, and the like.

SUMMARY OF THE INVENTION

Applicants' invention includes a method to determine, store, access, and use, the read and/or the write capability of the (i)th input/output ("I/O") device disposed in a computer system, and to determine, store, access, and use, the write capability of the (j)th information storage medium disposed in that computer system, where the computer system comprises (N) input/output devices, (N) device bits, (N) device identifiers, (M) information storage media, and (M) media bits, and where each of the (N) device bits is assigned to a different one of the (N) input/output devices, each of the (N) device identifiers is assigned to a different one of the (N) input/output devices, and each of the (M) media bits is assigned to a different one of the (M) information storage media, where (i) is greater than or equal to 1 and less than or equal to (N), and where (j) is greater than or equal to 1 and less than or equal to (M). The write capability of each input/output device is determined, a device bit assigned to that input/output device is set to 1 if the device can write information, and that device bit is stored for subsequent use. The write capability of each information storage medium is determined, and a media bit assigned to that medium is set to 1 if the medium is writeable, and that media bit is stored for subsequent use.

Applicants' invention further includes a method to determine the write capability of an allocated input/output device in combination with a designated information storage medium by accessing the device bit assigned to the allocated device and accessing the media bit assigned to the medium. The Recording Index for that device/medium combination is formed by multiplying the assigned device bit times the assigned media bit. If that Recording Index equals 1, then the device/medium combination is a proper write target.

Applicants' invention further includes a method to create and display a read target table comprising the I/O devices disposed in, or attached to, a computer system, where each of those I/O devices can read information from an information storage medium disposed therein. Applicants' invention further includes a method to create and display a write target table comprising the I/O devices disposed in, or attached to, a computer system, where each of those I/O devices can write information to an information storage medium disposed therein.

Applicants' invention further includes a computer system comprising a computer useable medium having computer readable program code disposed therein to determine, store, access, and use, the write capability of one or more input/ output devices disposed in that computer system, and to determine, store, access, and use, the write capability of one or more information storage medium disposed in that computer system. Applicants' invention further includes a computer system comprising a computer useable medium having computer readable program code disposed therein to determine the write capability of an allocated input/output device in combination with a designated information storage medium by accessing the device bit assigned to the allocated device and accessing the media bit assigned to the medium.

Applicants' invention further includes a computer system comprising a computer useable medium having computer readable program code disposed therein to create and display a read target table comprising the I/O devices disposed in, or attached to, a computer system, where each of those I/O devices can read information from an information storage medium disposed therein. Applicants' invention further includes a computer system comprising a computer useable medium having computer readable program code disposed therein to create and display a write target table comprising the I/O devices disposed in, or attached to, a computer system, where each of those I/O devices can write information to an information storage medium disposed therein.

Applicants' invention further includes a computer program product usable with a programmable computer processor having computer readable program code embodied therein to determine, store, access, and use, the write capability of one or more input/output devices disposed in that computer system, and to determine, store, access, and use, the write capability of one or more information storage medium disposed in that computer system. Applicants' invention further includes a computer program product usable with a programmable computer processor having computer readable program code embodied therein for determining the write capability of an allocated input/output device in combination with a designated information storage medium by accessing the device bit assigned to the allocated device and accessing the media bit assigned to the medium.

Applicants' invention further includes a computer program product usable with a programmable computer processor having computer readable program code embodied therein to create and display a read target table comprising the I/O devices disposed in, or attached to, a computer system, where each of those I/O devices can read information from an information storage medium disposed therein. Applicants' invention further includes a computer program product usable with a programmable computer processor having computer readable program code embodied therein to create and display a write target table comprising the I/O devices disposed in, or attached to, a computer system, where each of those I/O devices can write information to an information storage medium disposed therein.

BRIEF DESCRIPTION OF THE DRAWINGS

The invention will be better understood from a reading of the following detailed description taken in conjunction with the drawings in which like reference designators are used to designate like elements, and in which:

FIG. 5A is a flowchart summarizing certain steps in Applicant's method to determine and store the write capability of (N) input/output devices and (M) information storage media disposed in a computer system;

FIG. 6 is a table summarizing the write capability of various optical information storage media;

FIG. 7 is a table summarizing the write capability of various optical input/output devices;

FIG. 8 is a matrix summarizing the write capabilities of various combinations of optical information storage media and optical input/output devices;

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicants' apparatus and method is not meant, however, to limit Applicant's invention to either data storage and retrieval systems, or to use of optical information storage media/devices, as the invention herein can be implemented in computer software, including word processing programs, spreadsheet programs, database programs, and the like, as well as in storage management programs for data storage and retrieval systems.

Figure 3:
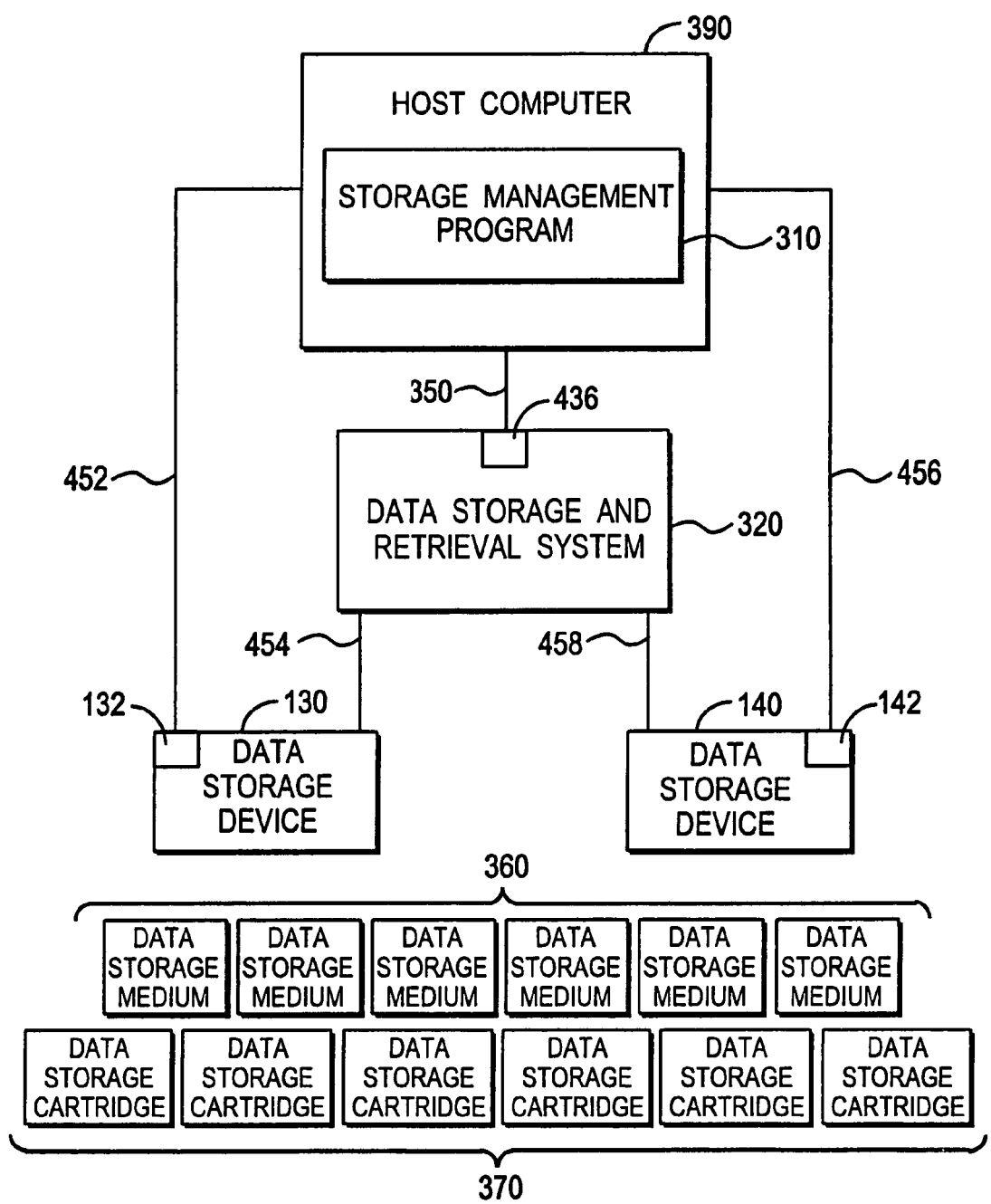
FIG. 3 is a block diagram showing the components of Applicants' data storage and retrieval system.

FIG. 3 illustrates the hardware and software environment in which preferred embodiments of the present invention are implemented. Host computer 390 includes, among other programs, a storage management program 310. In certain embodiments, host computer 390 comprises a single computer. In alternative embodiments, host computer 390 comprises one or more mainframe computers, one or more work stations, one or more personal computers, combinations thereof, and the like.

Information is transferred between the host system 390 and secondary storage devices managed by a data storage and retrieval system, such as data storage and retrieval system 320, via communication links 350, 452, and 456. Communication links 350, 452, and 456, comprise a serial interconnection, such as an RS-232 cable or an RS-432 cable, an ethernet interconnection, a gigabit ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, data storage and retrieval system 320 includes input/output devices 130 and 140. In alternative embodiments, Applicants' data storage and retrieval system 320 includes more than two input/output devices.

A plurality of portable data storage media 360 are moveably disposed within Applicants' data storage and retrieval system. In certain embodiments, the plurality of data storage media 360 are housed in a plurality of portable data storage cartridges 370. Each of such portable data storage cartridges may be removeably disposed in an appropriate input/output device.

Data storage and retrieval system 320 further includes program logic to manage input/output devices 130 and 140, and plurality of portable data storage cartridges 370. In alternative embodiments, data storage and retrieval system 320 and host system 390 may be collocated on a single apparatus.

Host system 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The storage management program 310 in the host system 390 may include the functionality of storage management type programs known in the art that manage the transfer of data to a data storage and retrieval system, such as the IBM DFSMS implemented in the IBM MVS operating system.

The IBM DFSMS software is described in "DFSMS/MVS V1R4 General Information," IBM document no. GC26-4900-05, published by IBM (Copyright 1997, IBM), which publication is incorporated herein by reference in its entirety. In addition to including known storage management program functions, such as recall and migration, the storage management program 310 would further include additional program instructions to perform the operations of the preferred embodiments of the present invention. The storage management program 310 may be implemented within the operating system of the host system 390 or as a separate, installed application program. Alternatively, storage management program 310 may include device drivers, backup software, and the like.

The data storage and retrieval system 320 comprises a computer system, and manages, for example, a plurality of tape drives and tape cartridges. In such tape drive embodiments, tape drives 130 and 140 may be any suitable tape drives known in the art, e.g., the Magstar 3590 tape drives. (Magstar is a registered trademark of IBM Corporation). Similarly, data storage cartridge 370 may be any suitable tape cartridge device known in the art, such as ECCST, Magstar, IBM 3420, 3480, 3490E, 3590 tape cartridges, etc.

Figure 1:
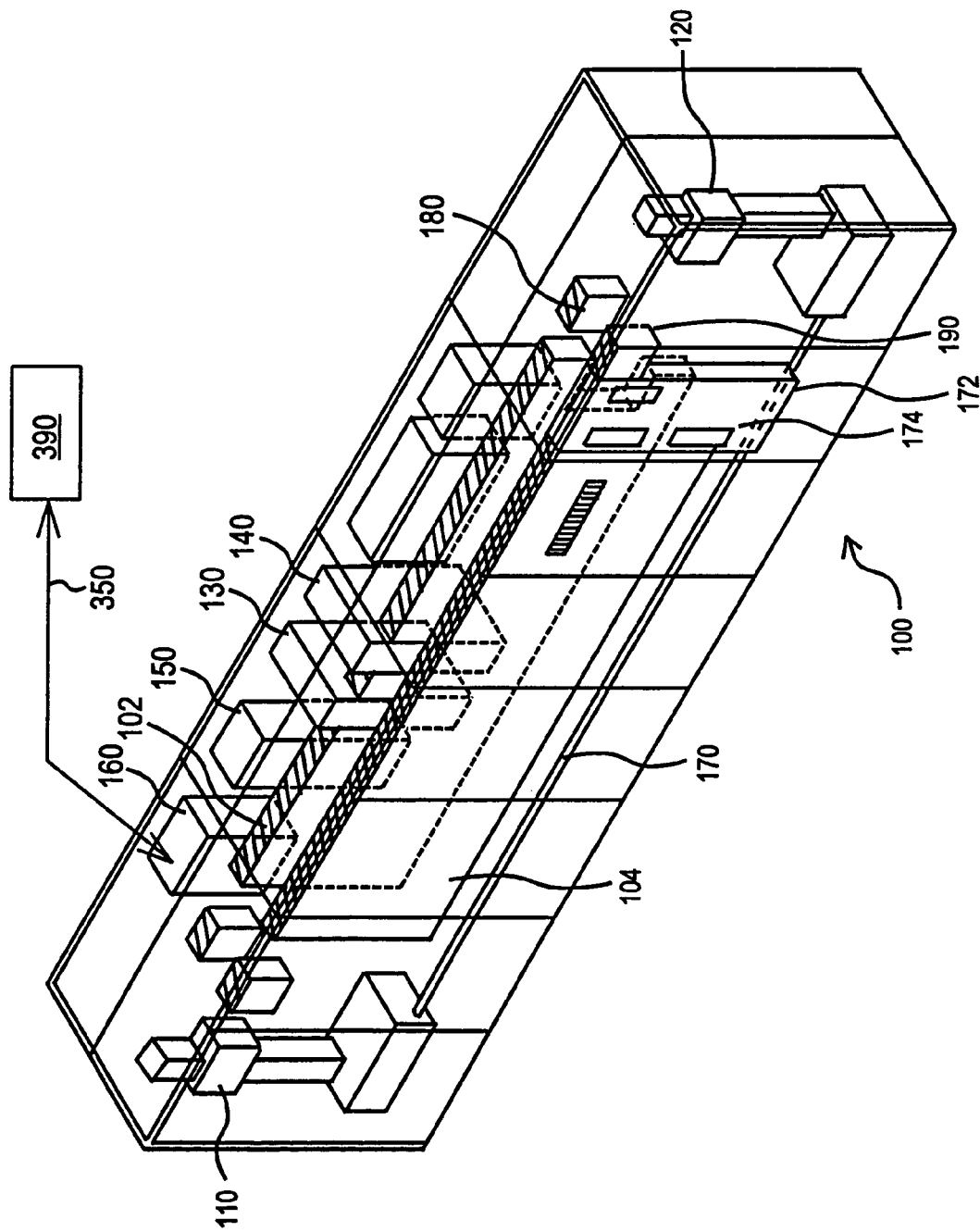
FIG. 1 is a perspective view of a first embodiment of Applicant's data storage and retrieval system.

Referring now to FIG. 1, data storage and retrieval system 100 communicates with one or more host computers, such as host computer 390 (FIG. 3), via one or more communication links, such as communication link 350 (FIG. 3). Data storage and retrieval system 100 includes first wall of storage slots 102 and second wall of storage slots 104. Portable data storage media, such as media 360 (FIG. 3) are individually stored in these storage slots. In certain embodiments, such data storage media are individually housed portable housings, i.e. cartridge 370 (FIG. 3). Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to input/output devices 130/140 for reading and/or writing data thereon, and returns the media to the proper storage slot. As shown in FIG. 1, accessors 110 and 120 travel bi-directionally along rail 170 in an aisle disposed between first wall of storage slots 102 and second wall of storage slots 104. U.S. Pat. No. 6,038,490, entitled "Automated Data Storage Dual Picker Interference Avoidance," teaches a method to prevent collisions occurring between accessors moveably disposed on the same rail system, and is hereby incorporated by reference herein.

Figure 4:
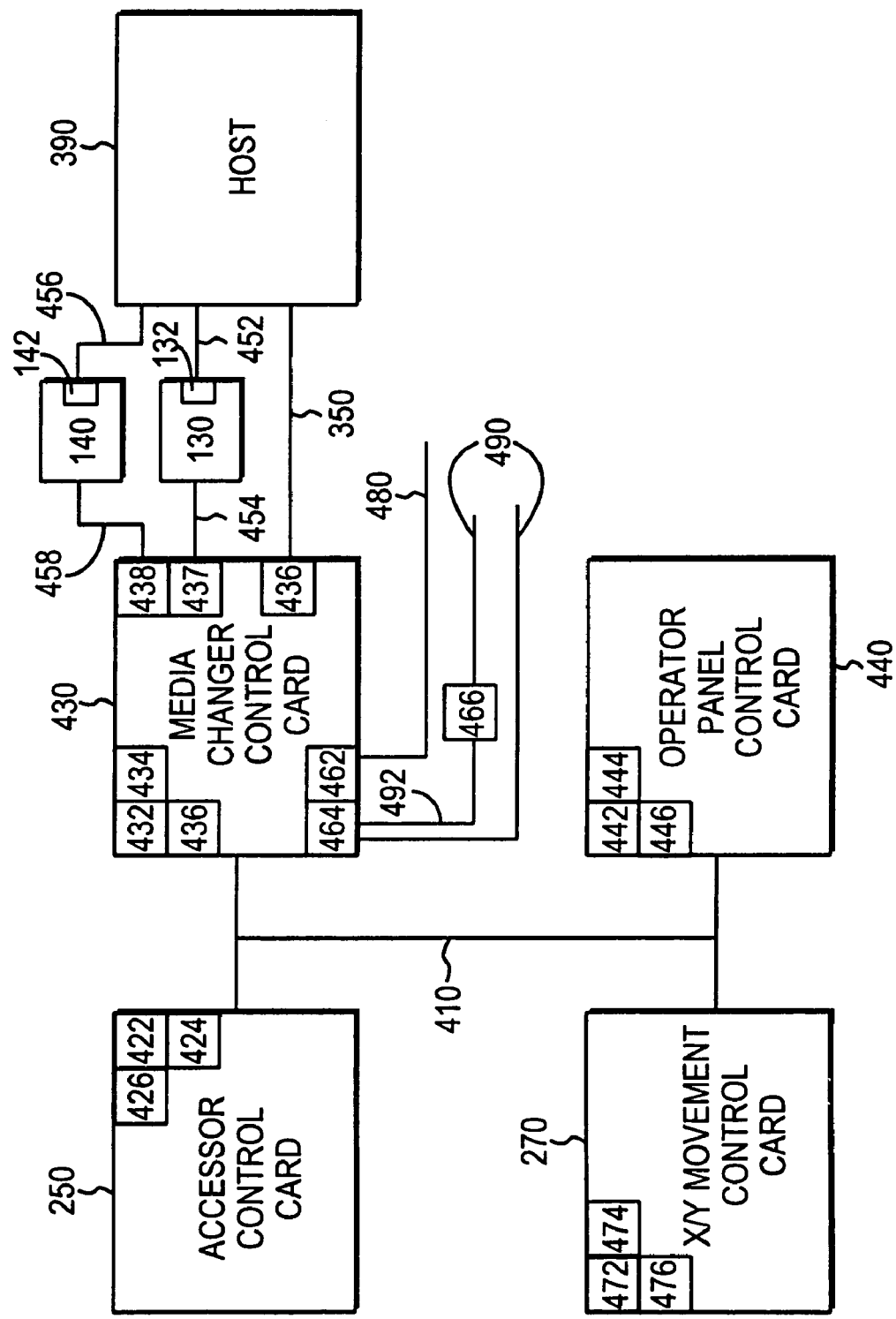
FIG. 4 is a is a schematic showing Applicant's distributed control network.

In certain embodiments, device 160 comprises a library controller. In certain of these embodiments, library controller 160 is integral with a computer. In other embodiments, Applicants' data storage and retrieval system utilizes a distributed control network. In these distributed control network embodiments, device 160 comprises a motion card pack. Motion card pack 160 includes media changer control card 430 (FIG. 4). Media changer control card 430 communicates with host computer 390 (FIGS. 3, 4).

Referring again to FIG. 1, operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges 370 or data storage media 360 can be placed in the system, or in the alternative, removed from the system, via station 172 and access door 174.

Figure 2:
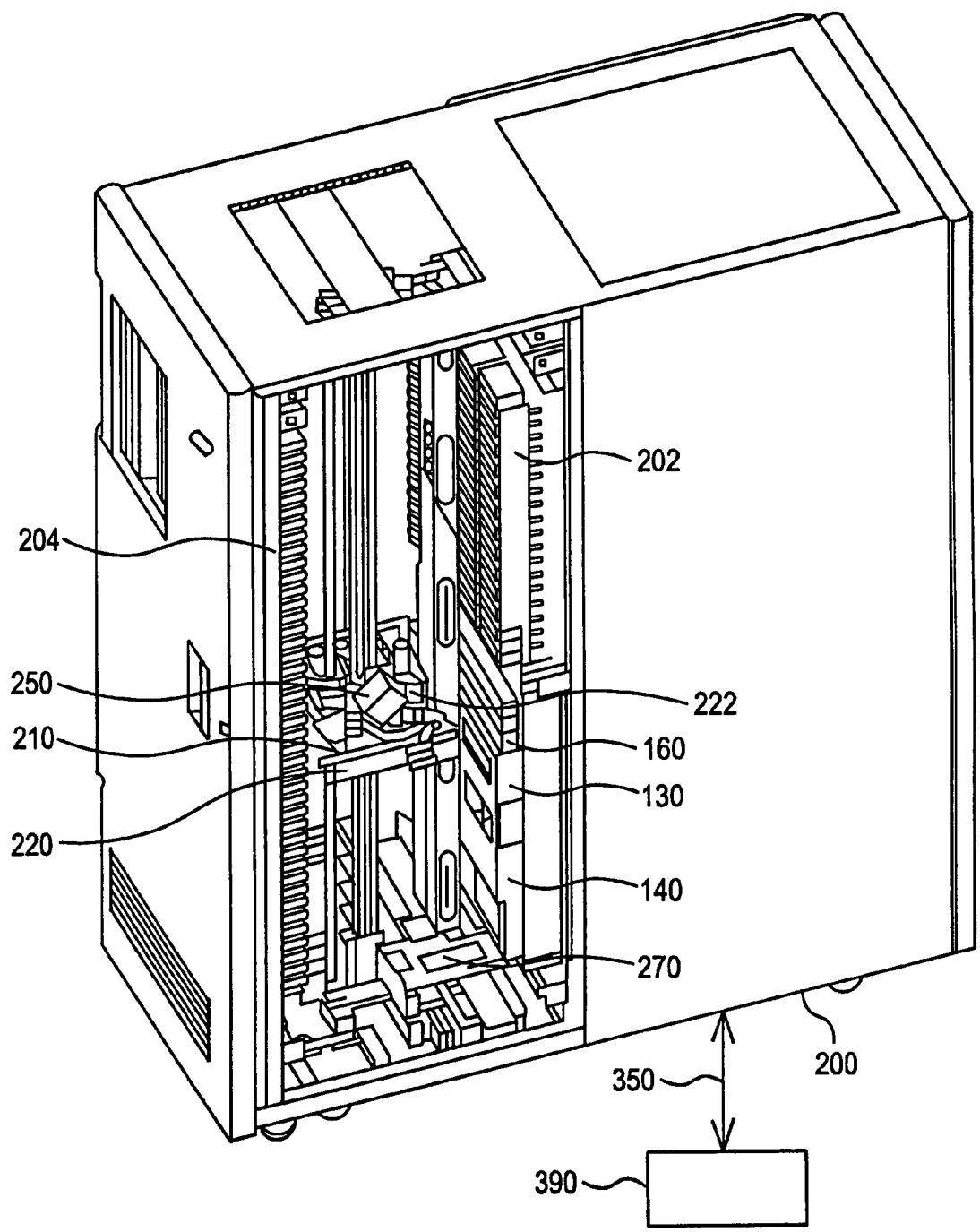
FIG. 2 is a perspective view of a second embodiment of Applicant's data storage and retrieval system.

FIG. 2 shows system 200 which comprises another embodiment of Applicant's data storage and retrieval system. System 200 communicates with one or more host computers, such as host computer 390 (FIG. 3), via one or more communication links, such as communication link 350 (FIG. 3). System 200 includes first storage wall 202 and second storage wall 204. Storage walls 202 and 204 each include a plurality of storage elements in which can be stored a plurality of portable data storage media. System 200 includes two or more input/output devices, such as devices 130 and 140. Input/output device 130/140 each comprise a floppy disk drive, an optical disk drive, a magnetic tape drive, and the like. System 200 further includes controller/motion card pack 160. System 200 further includes operator control panel 150 (not shown in FIG. 3).

System 200 further includes one or a plurality of portable data storage cartridges, such as cartridges 370 (FIG. 3), removeably disposed in one or more slots in storage walls 202/204. Each such cartridge contains a data storage medium, i.e. one of data storage media 360 (FIG. 3), internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and input/output device 130/140. Accessor 210 includes lifting servo section 220 on which is disposed at least one cartridge gripping mechanism 222 and, in certain embodiments, accessor control card 250. In certain embodiments, accessor 210 further includes X/Y movement control card 270.

FIG. 4 shows Applicant's distributed control network used in certain embodiments of data storage and retrieval systems 100 and 200. This distributed control system includes accessor control card 250 (FIGS. 2, 4), X/Y movement control card 270 (FIGS. 2, 4), operator panel control card 440 and media changer control card 430.

Communication bus 410 interconnects accessor control card 250, X/Y movement control card 270, operator panel control card 440 and media changer control card 430. In certain embodiments, bus 410 comprises an ethernet interconnection or a CANbus interconnection. Those skilled in the art will appreciate that CANbus technology was developed in the automotive industry, but now has gained wide acceptance in other industries.

In certain embodiments, accessor control card 250 is disposed on the lifting servo portion of accessor 110 (FIG. 1)/120 (FIG. 1)/210 (FIG. 2). In the embodiment shown in FIG. 4, accessor control card 250 includes microprocessor 422, non-volatile memory 424, and volatile memory 426. In certain distributed control network embodiments, accessor control card 250 (FIGS. 2, 4) serves as the library controller in Applicant's distributed control network.

Operator panel control card 440 is disposed within operator control panel 150 (FIG. 1). In the embodiment shown in FIG. 4, operator panel control card 440 includes microprocessor 442, nonvolatile memory 444, and volatile memory 446.

In certain embodiments, X/Y movement control card 270 is disposed on carriage portion of accessors 110 (FIG. 1), 120 (FIG. 1), 210 (FIG. 2). In the embodiment shown in FIG. 4, X/Y movement control card 270 includes microprocessor 472, nonvolatile memory 474, and volatile memory 476.

Media changer control card 430 is disposed within motion card pack 160 (FIGS. 1, 2). Media changer control card 430 includes microprocessor 432, nonvolatile memory 434, and volatile memory 436. In certain embodiments, media changer control card 430 includes network interface 462 which interconnects media changer control card 430 to one or more networks, such as network 480. In certain embodiments, network 480 comprises one or more local area networks, one or more private wide area networks, one or more public wide area networks, the internet, and combinations thereof.

In certain embodiments, media changer control card 430 includes device 464 which interconnects media changer control card 430 to one or more telephone systems, such as telephone system 490. In certain embodiments, device 464 comprises a modem. In these embodiments, modem 464 interconnects directly with telephone system 490. In alternative embodiments device 464 comprises a modem interface. In these embodiments, modem interface 464 interconnects via communication link 492 to modem 466. Modem 466 connects to telephone system 490. In certain embodiments, telephone system 490 comprises one or more private telephone systems, one or more public telephone systems, and combinations thereof.

Host computer 390 (FIGS. 1, 2, 3, 4) communicates with input/output device 130 (FIGS. 1, 2, 3, 4) via communication link 452 and host computer port 132 (FIGS. 3, 4). In certain embodiments, host computer port 132 is integral to device 130. Host computer 390 communicates with input/output device 140 (FIGS. 1, 2, 3, 4) via communication link 456 and host computer port 142. In certain embodiments, host computer port 142 is integral to device 140.

Input/output devices 130/140 communicate with media changer control card 430 via communication links 454/458 (FIGS. 3, 4) and interfaces 437/438 (FIG. 4), respectively. In certain embodiments, host computer 390 also communicates with media changer control card 430 (FIG. 4) via communication link 350 (FIGS. 3, 4) and host computer port 436 (FIG. 4). As those skilled in the art will appreciate, communication link 350 and host computer port 436 provide a control path into Applicant's distributed control network. Communication links 350, 452, 454, 456, and 458, are selected from the group comprising a serial interface, a local area network, a private wide area network, a public wide area network, a SCSI interface, a Fibre Channel interface, an ESCON interface, a FICON interface, and combinations thereof.

Applicants' invention includes a method to determine and store the write capabilities of one or more input/output ("I/O") devices and one or more information storage media disposed in a computer system. References herein to I/O devices disposed in a computer system include I/O devices integral to that a computer system, and remote I/O devices attached to that computer system. In certain embodiments, such a computer system comprises a mainframe computer. In certain embodiments, such a computer system comprises a personal computer. In certain embodiments, such a computer system comprises a work station.

In certain embodiments, such a computer system comprises a data storage and retrieval system such as system 100 (FIG. 1), system 200 (FIG. 2), and/or system 300 (FIG. 3). In certain embodiments, the one or more I/O devices comprise, for example, input/output device 130 (FIGS. 1, 2, 3, 4) and/or input/output device 140 (FIGS. 1, 2, 3, 4). In certain embodiments, the information storage media comprises one or more of media 360 (FIG. 3) and/or one or more of portable cartridges 370 (FIG. 3).

Referring now to FIG. 5A, step 502 initiates Applicants' method to determine and store, and optionally, display, the write capability of (N) input/output ("I/O") devices and (M) information storage media. In step 503, a first I/O device is selected, i.e. (i) is set to 1, and a first information storage medium is selected, i.e. (j) is set to 1. In certain embodiments, in step 504 that first input/output device is queried to determine its write capability. In certain embodiments, such a query is made using a READ DEVICE CHARACTERISTICS ("RDC") command. In certain embodiments, one or more host computers, such as host 390 (FIGS. 1, 2, 3, 4), issues such an RDC command. In certain embodiments, a storage management program, such as storage management program 310 (FIG. 3), issues such an RDC command. In certain embodiments, a library controller, such as controller 160 (FIGS. 1, 2), issues such an RDC command. In certain embodiments, one or more accessor controllers, such accessor controller 250 (FIG. 4), issues such an RDC command.

In certain embodiments, step 504 includes disposing a reference information storage medium in the (i)th input/output device, and determining the write capability of that device. In certain embodiments, such a determination is performed by a host computer. In certain embodiments, such a determination is performed by a storage management program. In certain embodiments, such a determination is performed by a library controller. In certain embodiments, such a determination is performed by one or more accessor controllers.

Based upon the query/test of step 504, in step 506 Applicants' method determines if the (i)th input/output device can write information. In certain embodiments, such a determination is performed by a host computer. In certain embodiments, such a determination is performed by a storage management program. In certain embodiments, such a determination is performed by a library controller. In certain embodiments, such a determination is performed by one or more accessor controllers.

In the event Applicants' method determines that the (i)th I/O device can write information, then in step 508 the (i)th device bit, assigned to that (i)th I/O device, is set to 1. In certain embodiments, a host computer sets this device bit. In certain embodiments, a storage management program sets this device bit. In certain embodiments, a library controller sets this device bit. In certain embodiments, one or more accessor controllers sets this device bit.

In the event Applicants' method determines that the (i)th I/O device cannot write information, then in step 510 the (i)th device bit is set to 0. In certain embodiments, a host computer sets this device bit. In certain embodiments, a storage management program sets this device bit. In certain embodiments, a library controller sets this device bit. In certain embodiments, one or more accessor controllers sets this device bit.

In step 512, the device bit set in either step 508 or 510 is stored. In certain embodiments, the device bit is stored by a host computer. In certain embodiments, the device bit is stored by a storage management program. In certain embodiments, the device bit is stored by a library controller. In certain embodiments, the device bit is stored by one or more accessor controllers.

In certain embodiments, where the device bit is set to 1, that device bit is written to a Write Target Table. In certain embodiments, such a Write Target Table is stored in a host computer. In certain embodiments, such a Write Target Table is stored in a storage management program. In certain embodiments, such a Write Target Table is stored in a library controller. In certain embodiments, such a Write Target Table is stored in one or more accessor controllers.

In certain embodiments of Applicants' method discussed in greater detail below, the computer system includes a display device. In certain embodiments, the system includes a visual display device. In certain embodiments, the system's Write Target Table is displayed on the display device/visual display device in response to the computer user invoking either a SAVE command, or a SAVE AS command. In these embodiments, only writeable input/output devices are presented to the user as potential write targets.

In step 514, Applicants' method determines if all the I/O devices disposed in the system have been characterized, i.e. determines if (i) equals (N). In the event additional I/O devices remain to be queried/tested, then Applicants' method transitions to step 516 wherein (i) is incremented and then to step 504 wherein the write capability of the [(i)+1]th I/O device is determined. On the other hand, if all the I/O devices have been characterized, then Applicants' method transitions to step 518.

In step 518, Applicants' method determines the write capability of the (j)th information storage medium disposed in the system. In certain embodiments, this (j)th medium is queried to determine its write capability. In certain embodiments, such a query is performed using a READ MEDIA CHARACTERISTICS command. In certain embodiments, a host computer, such as host 390 (FIGS. 1, 2, 3, 4), issues such an RMC command. In certain embodiments, a storage management program, such as storage management program 310 (FIG. 3), issues such an RMC command. In certain embodiments, a library controller, such as controller 160 (FIGS. 1, 2), issues such an RMC command. In certain embodiments, one or more accessor controllers, such accessor controller 250 (FIG. 4), issues such an RMC command.

As those skilled in the art will appreciate, certain optical media, such as "DVD" media, include a Disc Structure Byte. In certain embodiments, this Disc Structure Byte comprises what is sometimes referred to as "BP 2" byte which is usually the second byte in the physical format information sector disposed on such a DVD disk. Referring to FIGS. 5A and 6, when using certain optical media step 518 (FIG. 5A) includes examining the BP 2 byte (FIG. 6). In the event the query of such a BP 2 byte returns a value 0001b, then in step 520 (FIG. 5A) Applicants' method determines that the media is not writeable, and the media bit is set to zero in step 524. On the other hand, if the query of step 518 (FIG. 5A) returns a value of 0100b or 0010b, then in step 520 (FIG. 5A) Applicants' method determines the media is writeable, and in step 522 sets the media bit for that media to 1.

Referring again to FIG. 5A, in certain embodiments, in step 518 the (j)th information storage medium is disposed in a reference input/output device, and the write capabilities of the medium are determined. In certain embodiments, such a determination is performed by one or more host computers. In certain embodiments, such a determination is performed by a storage management program. In certain embodiments, such a determination is performed by a library controller. In certain embodiments, such a determination is performed by one or more accessor controllers.

Based upon the query/test of step 518, in step 520 Applicants' method determines if the (j)th information storage medium is writeable. In certain embodiments, such a determination is performed by a host computer. In certain embodiments, such a determination is performed by a storage management program. In certain embodiments, such a determination is performed by a library controller. In certain embodiments, such a determination is performed by one or more accessor controllers.

In the event Applicants' method determines that the (j)th information storage medium is writeable, then in step 522 the (j)th media bit, assigned to that (j)th information storage medium, is set to 1. In certain embodiments, a host computer sets this media bit. In certain embodiments, a storage management program sets this media bit. In certain embodiments, a library controller sets this media bit. In certain embodiments, one or more accessor controllers sets this media bit.

In the event Applicants' method determines that the (j)th information storage medium is not writeable, then in step 524 the (j)th media bit is set to 0. In certain embodiments, a host computer sets this media bit. In certain embodiments, a storage management program sets this media bit. In certain embodiments, a library controller sets this media bit. In certain embodiments, one or more accessor controllers sets this media bit.

In step 526, the media bit set in either step 522 or 524 is stored. In certain embodiments, the media bit is stored by a host computer. In certain embodiments, the media bit is stored by a storage management program. In certain embodiments, the media bit is stored by a library controller. In certain embodiments, the media bit is stored by one or more accessor controllers.

In certain embodiments, where the media bit is set to 1, that media bit is written to a Write Target Table. In certain embodiments, such a Write Target Table is stored in a host computer. In certain embodiments, such a Write Target Table is stored in a storage management program. In certain embodiments, such a Write Target Table is stored in a library controller. In certain embodiments, such a Write Target Table is stored in one or more accessor controllers.

In step 528, Applicants' method determines if all the information storage media disposed in the system have been characterized, i.e. determines if (1) equals (M). In the event additional information storage media remain to be queried/tested, then Applicants' method transitions to step 530 wherein (j) is incremented and then to step 518 wherein the write capability of the [(j)+1]th information storage medium is determined. On the other hand, if all the information storage media have been characterized, then Applicants' method transitions to step 532.

If the computer system utilizes a single information storage media type, then the write capability of the (i)th input/output device in combination with the (j)th information storage media can be determined using the (i)th device bit and the (j)th media bit. Multiplying the (i)th device bit times the (j)th media bit gives the (i)th(j)th Recording Index for that device/medium combination. If that (i)th(j)th Recording Index equals 1, then the device/media combination is writeable. If the (i)th(j)th Recording Index equals 0, then either the device bit, the media bit, or both, equal zero, and therefore, the device/medium combination is not writeable.

Applicants' method determines in step 532 if the computer system uses two or more data storage media types. If multiple information storage media types are used, then Applicants' method transitions to step 540 to determine the write capability of a designated information storage medium in combination with an allocated input/output device. Alternatively, if Applicants' method determines in step 532 that the computer system does not use two or more information storage media types, then Applicants' method ends at step 595.

As those skilled in the art will appreciate, such differing information storage media include, for example, magnetic storage media, optical storage media, electronic storage media, and the like. In addition, a system may comprise more than one type of magnetic, optical, and/or electronic media. For instance, magnetic storage media may comprise one or more hard disks disposed in one or more hard disk drives, magnetic tape disposed in one or more portable cartridges, and the like. Similarly, electronic storage media may include a PROM, an EPROM, an EEPROM, Flash PROM, and the like.

As those skilled in the art will appreciate, optical media may comprise what are sometimes called "CD" media and "DVD" media. These optical information storage media differ, among other ways, in information storage density. In addition, both "CD" and "DVD" media may comprise read only types, i.e. "ROMs," once-writeable types, i.e. "Write Once Read Many" or "WORMs", and rewriteable types.

Referring again to FIG. 6, optical media includes read-only DVD-ROM media 610. Applicants' method in step 520 (FIG. 5A) would determine such DVD-ROM media to comprise non-writeable media. Therefore, in step 524 (FIG. 5A) Applicants' method sets media bit 615 for such a ROM information storage medium to 0. Optical media also includes, however, certain rewriteable types including DVD-RAM media 620 and rewriteable DVD-RW media 640. Applicants' method sets media bits 625 and 645 to 1 in step 522.

In addition, optical media also includes once-writeable information storage media, such as DVD-R media 630. If such DVD-R media 630 have not been written to, then in step 520 Applicants' method would determine such media to be writeable, and would set the media bit for that DVD-R media to 1 in step 522. During a second attempt to write information to a DVD-R media 630, however, Applicants' method would determine that such media is not writeable in step 520, and therefore, Applicants' method would set media bit 635 to 0 during such a second write attempt.

As those skilled in the art will appreciate, different technologies exist to write information to DVDs. For example, certain WORMs utilize an organic dye that darkens when exposed to a strong laser beam in the DVD-R drive. The darkening is permanent. The writing process is similar to photography. This darkened portion absorbs light when read rather than reflecting it. As those skilled in the art will further appreciate, certain vendors for these types of WORMs claim a data life for such organic dye-based WORMs of up to 100 years.

Another type of WORM is often called an Ablative WORM, i.e. an "OWORM." When recording information to an OWORM media portions are cut away to create darkened pits on the shiny substrate. The ablation is irreparable. Ablative WORM is generally the choice of large format (12" and 14" diameter) drive makers. Certain vendors claim a 300 year data life.

Another type of WORM/RW optical medium is sometimes called a Magneto-Optical (M/O) medium. This medium has a ferrous layer under its shiny layer. When writing information, the laser heats the disk while a magnet under the platter simultaneously attracts the ferrous layer. This change in magnetic polarity creates what is sometimes referred to as the Kerr Magneto-Optical effect.

As those skilled in the art will appreciate, the Kerr Magneto-Optical effect can be described as follows. A linear polarized laser beam, reflected off of a vertically magnetized magneto-optical recording surface, will have its polarization partially rotated. An elliptic polarization is created in the reflected laser beam, with the axis of the ellipse depending on the polarity of the magnetization of the recording surface of the magneto-optic media. Thus, as the vertical magnetic polarity of the MO recording surface changes between North and South, the axis of the ellipse in the reflected laser beam shifts back and forth. It is this shift in the axis of the ellipse which is detected by the read detector in an MO drive.

Information is erased by reversing the magnet to repel while the laser heats the same portion of the disk, thus making the disk re-writeable. A write-once (WORM) variant of M/O also exists. WORM M/O media is formatted at the factory with a code that informs the drive not to erase data already written to the disk. The media is otherwise identical to rewriteable media so even WORM M/O is physically rewriteable. Certain vendors rate their M/O media for up to a 40 year data life.

Yet a different type of writeable optical medium utilizes a phase-change material to record information. Phase-change media has a polymer substrate that changes from crystalline (shiny) to amorphous (dull) when hit by a laser beam. WORM phase-change media changes only once. Re-writeable phase-change media is chemically different and is formulated to change from shiny to dull and back again. Phase-change is simpler than M/O, requiring no magnet. Re-writeable phase-change is also faster since the new data is written in one pass over the disk, whereas M/O disks erase the data prior to writing new data. Certain vendors rate their phase-change media for 30 years.

FIG. 6 includes a "Management Class" designation for various optical media. Such a Management Class refers to a certain recording format available for a certain media type. In certain embodiments of Applicants' method discussed below, in addition to designating an information storage medium and allocating a data storage device, a user can also specify that a certain information recording technology be used by including a Management Class in the write operation command. As those skilled in the art will appreciate, because ROMs do not comprise writeable media, Applicants' method recognizes no Management Class designation for such ROM media. Therefore, Management Class 617, for ROM media 610, includes no designators.

As those skilled in the art will appreciate, corresponding input/output devices exist for the differing optical media discussed above. Referring to FIG. 7, input/output devices for optical media include DVD-ROM device 710 for reading information from DVD-ROM media 610 (FIG. 6). Because DVD-ROM media is not writeable, a DVD-ROM device is not write capable. Therefore, device bit 715 is "0". Other DVD device include DVD-RAM device 720 for reading and writing information to DVD-RAM media 620 (FIG. 6), DVD-R device 730 for reading and writing information to DVD-R media 630 (FIG. 6), and DVD-RW 740 drive for reading and writing information to DVD-RW media 640 (FIG. 6). Referring to FIG. 7, the device bits 725, 735, 745 for DVD devices 720, 730, and 740, are "1", because those DVD devices are write capable.

As discussed above, the Recording Index for a certain input/output device and a certain information storage medium comprises the multiplication product of the respective device bit and media bit. Alternatively, the Recording Index comprises the Boolean logical "AND" of the media bit and the device bit. FIG. 8 summarizes the Recording Index for the various DVD devices and media discussed above, and combinations thereof. As those skilled in the art will appreciate, DVD technology is undergoing a convergence of technologies. Modernly, most DVD drives will read information from all types of DVD media. In addition, most writeable DVD drives can also write information to most types of writeable DVD media.

Recording Indices formed using a device bit for a ROM device, or using a media bit for a ROM medium, are necessarily 0. Thus, Recording Indices 812, 814, 816, 818, 822, 832, and 842, are 0. Recording Index 824, comprising the product of media bit 625 for a DVD-RAM media 620 and device bit 725 for DVD-RAM media 720, is 1. Similarly, Recording Index 848, comprising the product of media bit 645 for a DVD-RW media 640 and device bit 745 for DVD-RW media 740, is 1. Therefore, Recording Indices 834, 828, 838, and 844, corresponding to use of DVD-RAM/DVD-RW devices and media are 1. DVD-R media 630 is writeable initially, but not rewriteable thereafter. Therefore, a system which uses DVD-R media 630 actually utilizes differing media types, i.e. writeable DVD-R media and non-writeable, i.e. already used, DVD-R media, and has recording indices 826, 836, 846 which are valued at 1 or 0 accordingly.

Referring again to FIGS. 5A and 5B, in step 532 (FIG. 5A) Applicants' method determines if differing storage media types are used in the system. Applicants' method would determine in step 532 (FIG. 5A) that a computer system using DVD-R media comprises a system that uses differing storage media. In order to determine the Recording Index for a designated information storage medium in combination with an allocated input/output device, in a system which utilizes differing information storage media and devices, Applicants' method uses the embodiment shown in FIG. 5B.

In step 540, Applicants' method sets (j)start to 1. Thereafter in step 550, Applicants' method selects a first I/O device, i.e. (i) is set to 1, and a first information storage medium, i.e. (j) is set to (j)start. In step 560, Applicants' method determines whether the allocated I/O device, i.e. the (i)th device, can write information to the designated information storage medium, i.e. the (j)th medium. In various embodiments, step 560 includes attempting to mount the designated information storage medium in the allocated I/O device. If such a mount is successful, then step 560 further includes attempting to write information to the designated information storage medium. In certain embodiments, a host computer, such as host 390 (FIGS. 1, 2, 3, 4) makes the determination of step 560. In certain embodiments, a storage management program, such as storage management program 310 (FIG. 3), makes the determination of step 560. In certain embodiments, a library controller, such as controller 160 (FIGS. 1, 2), makes the determination of step 560. In certain embodiments, one or more accessor controllers, such accessor controller 250 (FIG. 4), makes the determination of step 560.

In the event Applicants' method determines that the device/medium combination is writeable, then in step 565 Applicants' method assigns a Recording Index of 1 for that device/medium combination. In step 570, that Recording Index is saved. In certain embodiments, a host computer, such as host 390 (FIGS. 1, 2, 3, 4), causes the Recording Index of step 565 to be saved. In certain embodiments, a storage management program, such as storage management program 310 (FIG. 3), causes the Recording Index of step 565 to be saved. In certain embodiments, a library controller, such as controller 160, causes the Recording Index of step 565 to be saved. In certain embodiments, one or more accessor controllers, such accessor controller 250 (FIG. 4), causes the Recording Index of step 565 to be saved.

Applicants' method transitions from step 570 to step 571 wherein Applicants' method determines if (j)start equals (M). In this embodiment, (j)start does not equal 1, and therefore, in this embodiment Applicants' method transitions from step 571 to step 575. In addition, in the event Applicants' method determines in step 560 that the (i)th device/(j)th information storage medium combination is not writeable, then Applicants' method transitions to step 575. In step 575, Applicants' method determines if all of the available information storage media have been tested in the first input/output device. In the event additional media remain to be tested using that first device, then Applicants' method increments (j) in step 580 and transitions to step 560 to test another information storage medium in the first input/output device.

In the event the write capability of the first input/output device with each of the available information storage media has been determined, then Applicants' method transitions from step 575 to step 585 wherein Applicants' method determines if all the possible combinations of input/output device and information storage media have been tested. In the event the write capability of one or more I/O devices remains to be determined, then Applicants' method transitions from step 585 to step 590 wherein (i) is set to (i+1) and wherein, in this embodiment, (j) is reset to 1. Applicants' method transitions from step 590 to step 560 to ascertain the write capability of another device with each of the available information storage media. In the event the write capability of all the possible device/medium combinations has been determined, then Applicants' method transitions from step 585 to step 592 wherein Applicants' method determines if the system's Write Target Table will be displayed. In this embodiment of Applicants' method, the system's Write Target Table is not being displayed, and therefore, in this embodiments Applicants' method transitions from step 592 to step 595 wherein this embodiment of Applicants' ends.

Figure 5B:
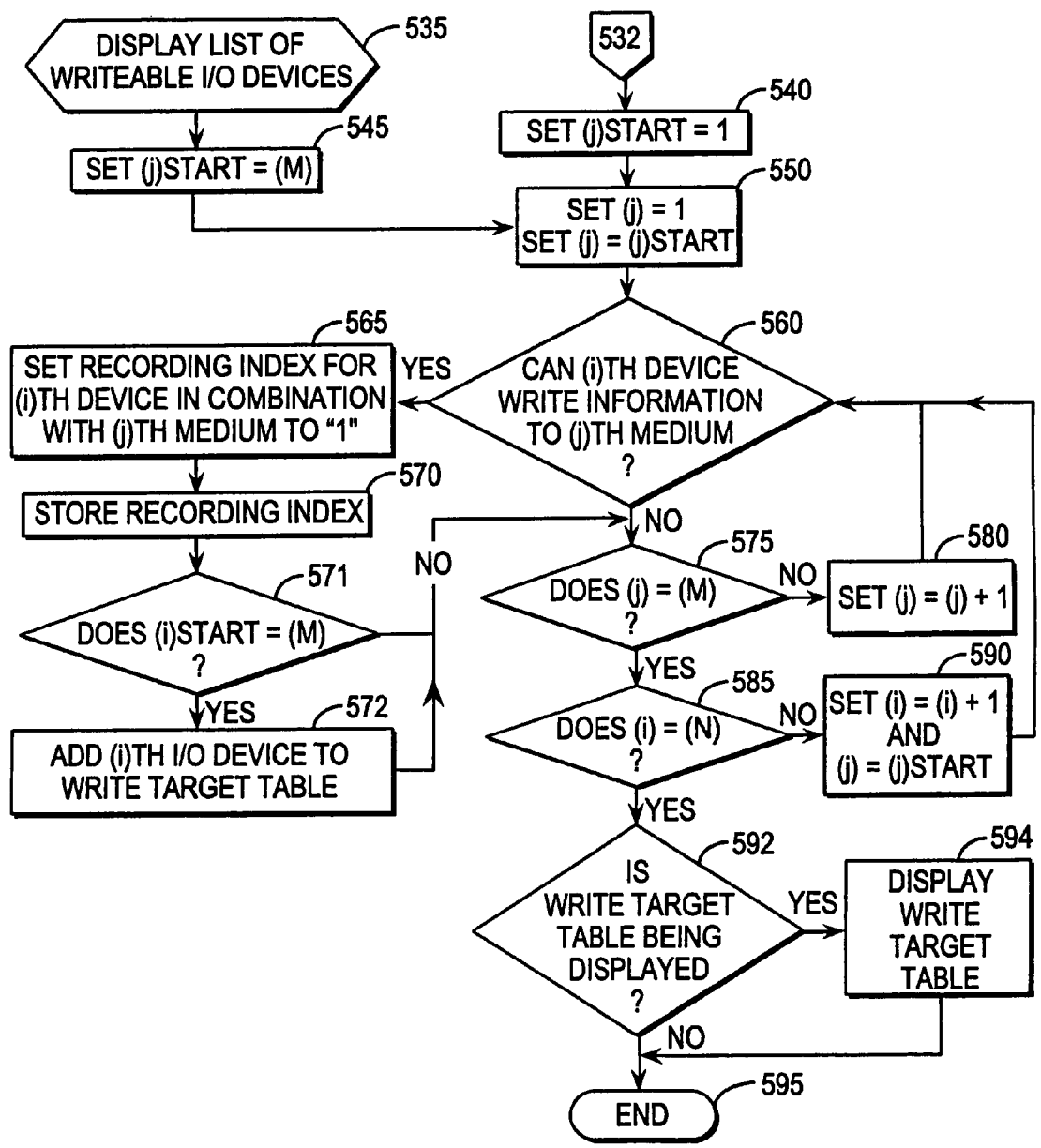
FIG. 5B is a flowchart summarizing additional steps in the method of FIG. 5A, and summarizing the steps of Applicants' method to create and display a Write Target Table.

Applicants' invention further includes a method to display a list of writeable 110 devices. Referring to FIG. 5B, this embodiment of Applicants' invention includes steps 535, 545, 550, 560, 565, 570, 571, 572, 575, 585, 590, 592, 594, and 595. In step 535, a user enters, for example, a "FILE SAVE" command, and thereby invokes this embodiment of Applicants' method. In this embodiment, the write capability of the (i)th device is not determined for all the various (M) information storage media disposed in the system. Rather in this embodiment, the (j)th medium comprises the information storage medium mounted in the (i)th I/O device. Therefore, in this embodiment of Applicants' invention Applicants' method transitions from step 535 to step 545 wherein (j)start is set to (M). Thereafter, in step 550 (i) is set to 1, and (j) is set to (M).

In this embodiment, in step 560 Applicants' method determines if the (i)th device can write information to the medium mounted therein. In the event there is no information storage medium mounted in the (i)th device, then Applicants' method determines in step 560 that the (i)th device cannot write information, and Applicants' method transitions from step 560 to step 575 wherein Applicants' method determines that (j)=(M). Steps 565, 570, and 585, and 590, are as described above.

In this embodiment, Applicants' method determines that (j)start does equal (M), and therefore, in this embodiments Applicants' method transitions from step 571 to step 572 wherein Applicants' method adds the (i)th device to the computer system's Write Target Table. In certain embodiments, a host computer, such as host 390, causes the (i)th device to be added to such a Write Target Table in step 572. In certain embodiments, a storage management program, such as storage management program 310 (FIG. 3), causes the (i)th device to be added to such a Write Target Table. In certain embodiments, a library controller, such as controller 160 (FIGS. 1, 2), causes the (i)th device to be added to such a Write Target Table. In certain embodiments, one or more accessor controllers, such accessor controller 250 (FIG. 4), causes the (i)th device to be added to such a Write Target Table.

In certain embodiments, the Write Target Table is stored in one or more host computers. In certain embodiments, the Write Target Table is stored in a storage management program. In certain embodiments, the Write Target Table is saved in a library controller. In certain embodiments, the Write Target Table is stored in one or more accessor controllers.

In this embodiment of Applicants' invention, Applicants' method transitions from step 572 to step 575, wherein Applicants' method determines that (j) does equal (M), and therefore, in this embodiment Applicants' method transitions from step 575 to step 585 wherein Applicants' method determines if (i)=(N). In the event Applicants' method determines in step 585 that the write capability of all of the (N) input/output devices has not been determined, i.e. (i) does not equal (N), then in this embodiment Applicants' method transitions from step 585 to step 590 wherein (i) is incremented, and (j) is again set to (M). Applicants' method then transitions from step 590 to step 560. Alternatively, if Applicants' method determines in step 585 that the write capability of each of the (N) input/output devices, in combination with the media individually mounted therein, has been determined, then in this embodiment Applicants' method transitions from step 585 to step 592 wherein Applicants' method determines if the system's Write Target Table will be displayed. In this embodiment, Applicants' method displays the Write Target Table, and therefore, Applicants' method transitions from step 592 to step 594 wherein the Write Target Table is displayed.

Figure 10A:
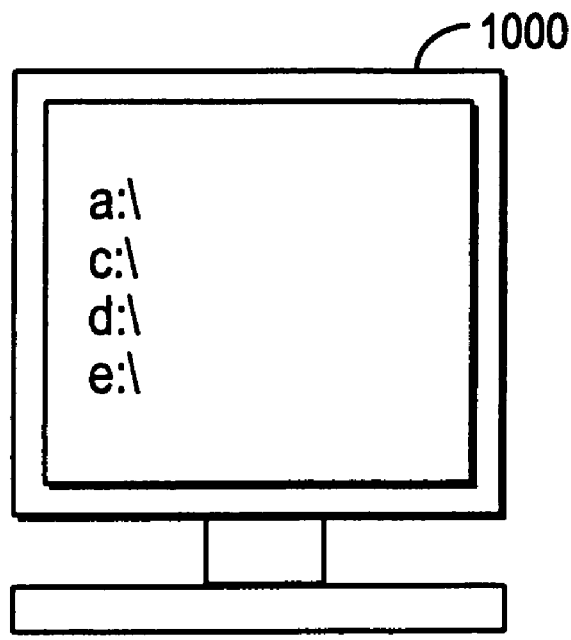
FIG. 10A shows a display of a Read Target Table.
Figure 10B:
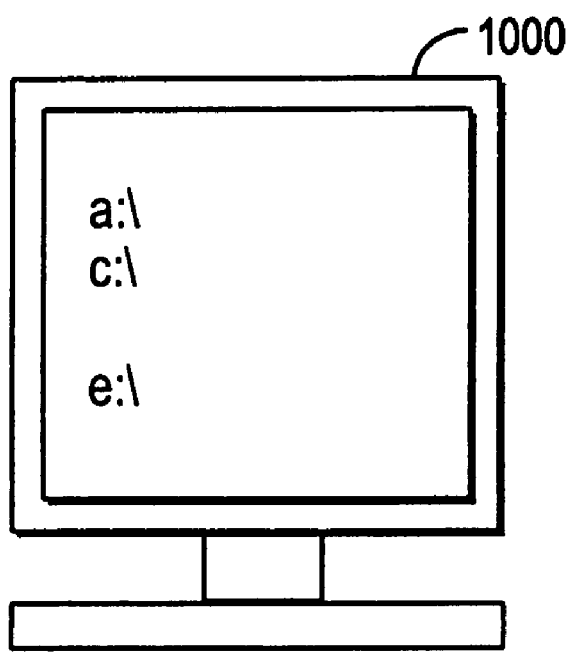
FIG. 10B shows a display of a Write Target Table.

FIG. 10B shows an embodiment of the display of step 594. In the embodiment of FIG. 10B, in response to, for example, a "SAVE AS" of step 535, Applicants' method displays the system's Write Target Table on display device 1000. In the embodiment shown in FIG. 10B, the Write Target Table includes identifiers for writeable I/O devices disposed in, or attached to, the computer system. In the embodiment of FIG. 10B, the Write Target Table includes device identifiers for an "a" I/O device, a "c" I/O device, and an "e" I/O device. In certain embodiments, such an "a" I/O device comprises a floppy disk drive. In certain embodiments, such a "c" I/O device comprises a hard disk drive. In certain embodiments, such an "e" I/O device comprises a data storage and retrieval system, such as system 100 (FIG. 1).

The embodiments of Applicants' method summarized in FIGS. 5A and 5B may be implemented separately. For example, one embodiment may include only the steps of FIG. 5A. As noted above, one embodiment of Applicants' invention includes steps 535, 545, 550, 560, 565, 570, 571, 572, 575, 585, 590, 592, 594, and 595. In addition, certain steps recited in FIGS. 5A and 5B may be performed, for example, by one or more host computers, while other steps may be performed by a storage management program, while other steps may be performed by a library controller, while yet other steps may be performed by one or more accessor control cards. Moreover, in certain embodiments, one or more individual steps of Applicants' method summarized in FIGS. 5A and 5B may be combined, eliminated, or reordered.

Applicants' invention further includes a computer system comprising a computer useable medium having computer readable program code disposed therein for determining and storing the write capability of one or more input/output devices, and one or more information storage media, disposed therein. Applicants' invention further includes a computer system comprising a computer useable medium having computer readable program code disposed therein for displaying device identifiers for one or more writeable input/output devices disposed therein.

Applicants' invention further includes a computer program product usable with a programmable computer processor having computer readable program code embodied therein for determining and storing the write capability of (N) I/O devices, and (M) information storage media, disposed in a computer system. Applicants' invention further includes a computer program product usable with a programmable computer processor having computer readable program code embodied therein for displaying device identifiers for one or more writeable input/output devices disposed therein.

Applicants' computer code products to determine and store the write capability of input/output devices and information storage media, and to create and display a Write Target Table, can be implemented in a wide variety of computer software, including word processing programs, spreadsheet programs, database programs, and the like. Applicants' methods to determine and store the write capability of input/output devices and information storage media, and to display a Write Target Table, can be implemented in a wide varieties of computer systems. For example, Applicants' method can be implemented in a personal computer. In such an implementation, certain of the steps of FIGS. 5A and/or 5B may require manual implementation in conjunction with prompts from the system. For example, the determination of step 504, and/or step 518, and/or step 560, may require that a user manually dispose a designated information storage medium in a specified I/O device. In certain embodiments, the system may provide an visual and/or oral prompt instructing the user how to proceed. On the other hand, Applicants' method, and computer program product to determine the write capability of (N) I/O devices, and (M) information storage media, can be implemented in a data storage and retrieval system, such as system 100/200/300.

Applicants' invention further includes a method to determine and store the read capability of the I/O devices disposed in, or attached to, a computer system. References herein to I/O devices disposed in a computer system include I/O devices integral to that a computer system, and remote I/O devices attached to that computer system. In certain embodiments, the computer comprises one or more personal computers. In certain embodiments, the computer system comprises one or more work stations. In certain embodiments, the computer system comprises one or more mainframe computers. In certain embodiments, the computer system comprises a data storage and retrieval system.

Figure 11:
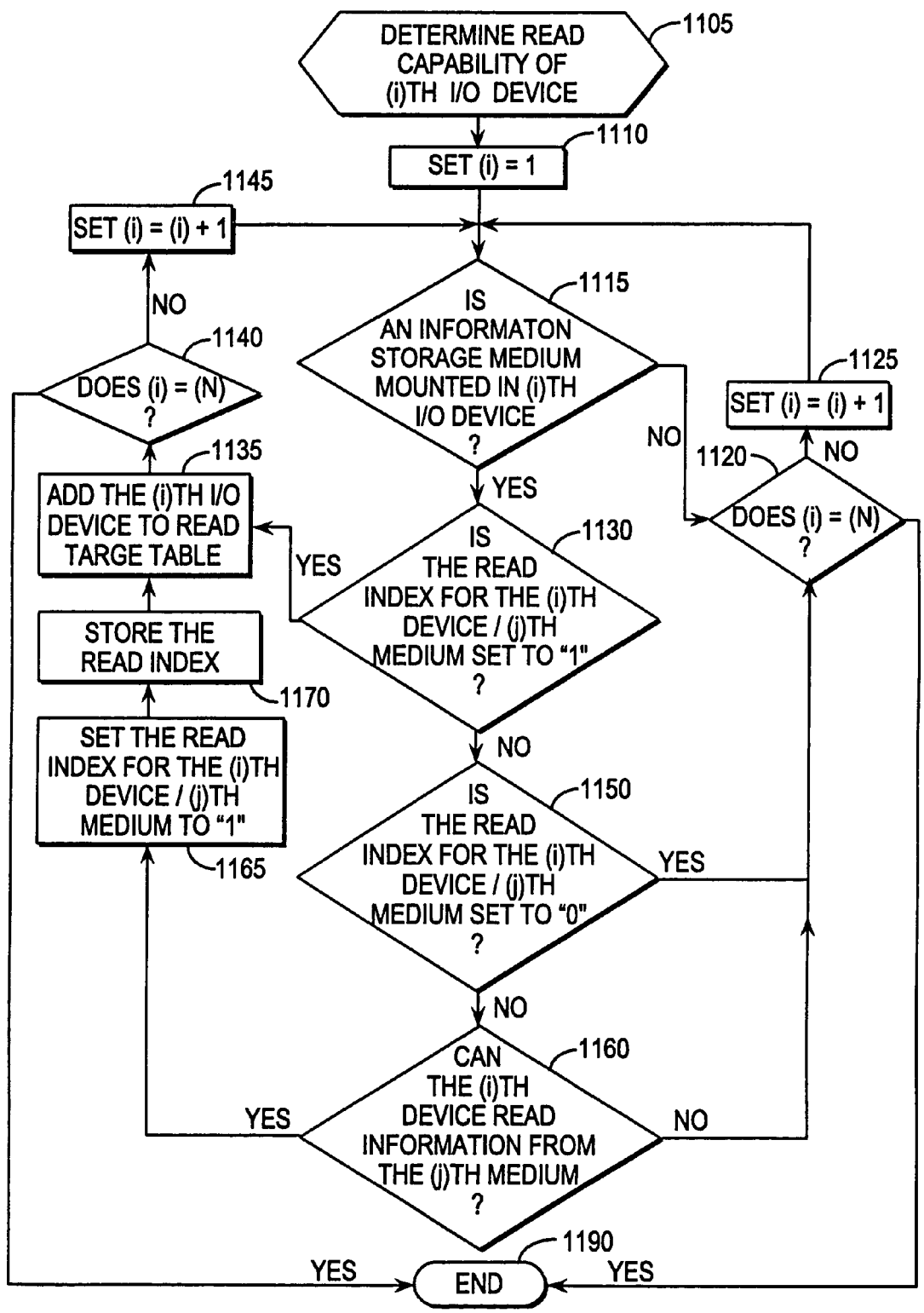
FIG. 11 is a flow chart summarizing the steps of Applicants' method to determine the read capability of the input output devices disposed in, or attached to, a computer system.

Referring now to FIG. 11, step 1105 initiates Applicants' method to determine the read capability of each of (N) I/O devices disposed in the afore-described computer system. In step 1110, a first I/O device is selected, i.e. (i) is set to 1. In step 1115, Applicants' method determines if an information storage medium is mounted in the (i)th I/O device. In certain embodiments, the determination of step 1115 is performed by one or more host computers. In certain embodiments, the determination of step 1115 is performed by a storage management program. In certain embodiments, the determination of step 1115 is performed by a library controller. In certain embodiments, the determination of step 1115 is performed by one or more accessor controllers.

If Applicants' method determines in step 1115 that an information storage medium is not mounted in the (i)th I/O device, Applicants' method transitions from step 1115 to step 1120 wherein Applicants' method determines if the read capability of all I/O devices disposed in the computer system has been determined, i.e. if (i) equals (N). In certain embodiments, the determination of step 1120 is performed by one or more host computers. In certain embodiments, the determination of step 1120 is performed by a storage management program. In certain embodiments, the determination of step 1120 is performed by a library controller. In certain embodiments, the determination of step 1120 is performed by one or more accessor controllers.

If Applicants' method determines in step 1120 that the read capability of all (N) I/O devices has been determined, then Applicants' method transitions from step 1120 to step 1190 wherein Applicants' method to determine and store the read capability of I/O devices ends. Alternatively, if Applicants' method determines in step 1120 that the read capability of all (N) I/O devices has not been determined, then Applicants' method transitions from step 1120 to step 1125 wherein (i) is incremented by 1. Applicants' method then transitions from step 1125 to step 1115.

If Applicants' method determines in step 1115 that an information storage medium, i.e. the (j)th information storage medium, is mounted in the (i) the I/O device, then Applicants' method transitions from step 1115 to step 1130 wherein Applicants' method determines if the Read Index for the (i)th device/O)th medium combination has previously been set to 1. Such a Read Index setting of 1 would indicate that the (i)th device can read information from the (j)th medium. In certain embodiments, the determination of step 1130 is performed by one or more host computers. In certain embodiments, the determination of step 1130 is performed by a storage management program. In certain embodiments, the determination of step 1130 is performed by a library controller. In certain embodiments, the determination of step 1130 is performed by one or more accessor controllers.

If Applicants' method determines in step 1130 that the Read Index for the (i)th device in combination with the (j)th medium is 1, then Applicants' method transitions from step 1130 to step 1135 wherein the (i)th I/O device is added to the computer system's Read Target Table. In certain embodiments, step 1135 is performed by one or more host computers. In certain embodiments, step 1135 is performed by a storage management program. In certain embodiments, step 1135 is performed by a library controller. In certain embodiments, step 1135 is performed by one or more accessor controllers.

Applicants' method transitions from step 1135 to step 1140 wherein Applicants' method determines if the read capability of all I/O devices disposed in the computer system has been determined, i.e. if (i) equals (N). In certain embodiments, the determination of step 1140 is performed by one or more host computers. In certain embodiments, the determination of step 1140 is performed by a storage management program. In certain embodiments, the determination of step 1140 is performed by a library controller. In certain embodiments, the determination of step 1140 is performed by one or more accessor controllers.

If Applicants' method determines in step 1140 that the read capability of all (N) I/O devices has been determined, then Applicants' method transitions from step 1140 to step 1190 wherein Applicants' method to determine and store the read capability of I/O devices ends. Alternatively, if Applicants' method determines in step 1140 that the read capability of all (N) I/O devices has not been determined, then Applicants' method transitions from step 1140 to step 1145 wherein (i) is incremented by 1. Applicants' method then transitions from step 1145 to step 1115.

If Applicants' method determines in step 1130 that the Read Index for the (i)th device in combination with the (j)th medium has not been set to 1, then Applicants' transitions from step 1130 to step 1150 wherein Applicants' method determines if the Read Index for the (i)the device in combination with the (j)th medium has been set to 0. In certain embodiments, the determination of step 1150 is performed by one or more host computers. In certain embodiments, the determination of step 1150 is performed by a storage management program. In certain embodiments, the determination of step 1150 is performed by a library controller. In certain embodiments, the determination of step 1150 is performed by one or more accessor controllers.

If Applicants' method determines in step 1150 that the Read Index for the (i)th device in combination with the (j)th medium has been set to 0, then Applicants' method transitions from step 1150 to step 1120. A Read Index of 0 indicates that the (i)th I/O device cannot read information from the (j)th information storage medium. Alternatively, if Applicants' method determines in step 1150 that the Read Index has not been set to 0, then Applicants' method transitions to step 1160 wherein Applicants' method determines if the (i)th I/O device can read information from the (j)th information storage medium. In certain embodiments, the determination of step 1160 is performed by one or more host computers. In certain embodiments, the determination of step 1160 is performed by a storage management program. In certain embodiments, the determination of step 1160 is performed by a library controller. In certain embodiments, the determination of step 1160 is performed by one or more accessor controllers.

If Applicants' method determines in step 1160 that the (i)th device cannot read information from the (j)th medium, then Applicants' method transitions from step 1160 to step 1120. Alternatively, if Applicants' method determines in step 1160 that the (i)th device can read information from the (j)th medium, then Applicants' method transitions from step 1160 to step 1165 wherein the Read Index for the (i)th device/(j)th medium combination is set to 1. In certain embodiments, step 1165 is performed by one or more host computers. In certain embodiments, step 1165 is performed by a storage management program. In certain embodiments step 1165 is performed by a library controller. In certain embodiments, step 1165 is performed by one or more accessor controllers.

Applicants' method transitions from step 1165 to step 1170 wherein Applicants' method stores the Read Index of step 1165. In certain embodiments, step 1170 is performed by one or more host computers. In certain embodiments, step 1170 is performed by a storage management program. In certain embodiments, step 1170 is performed by a library controller. In certain embodiments, step 1170 is performed by one or more accessor controllers. Applicants' method transitions from step 1170 to step 1135.

The steps of Applicants' method summarized in FIG. 11 may be implemented separately. In addition, certain steps recited in FIG. 11 may be performed, for example, by one or more host computers, while other steps may be performed, for example, by a storage management program, while other steps may be performed, for example, by a library controller, while yet other steps may be performed, for example, by one or more accessor control cards. Moreover, in certain embodiments, one or more individual steps of Applicants' method summarized in FIG. 11 may be combined, eliminated, or reordered.

Figure 9A:
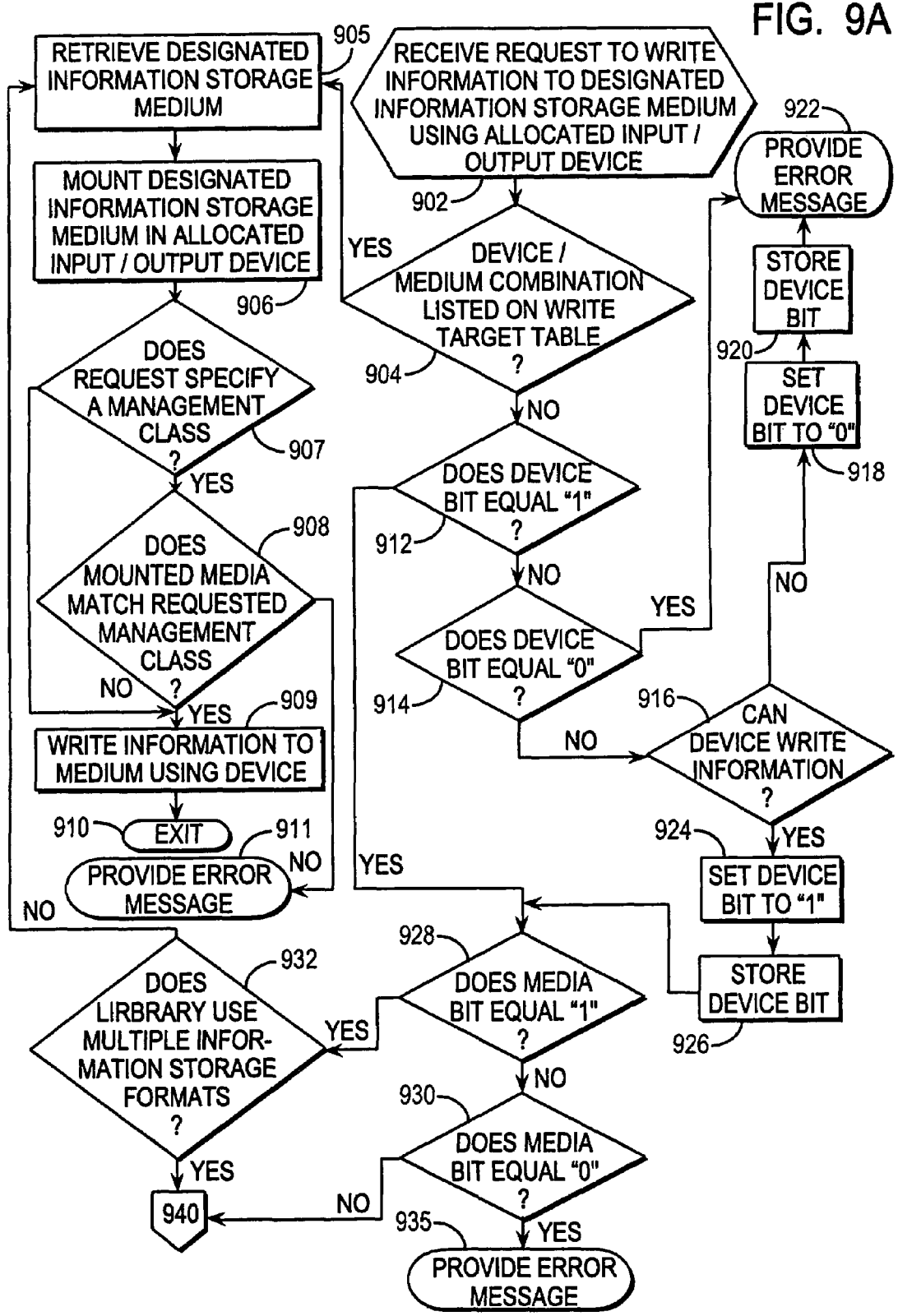
FIG. 9A is a flow chart summarizing the steps of Applicants' method to access and use the device bits and media bits determined in FIG. 5A to write information to a designated information storage medium using an allocated input/output device.
Figure 9B:
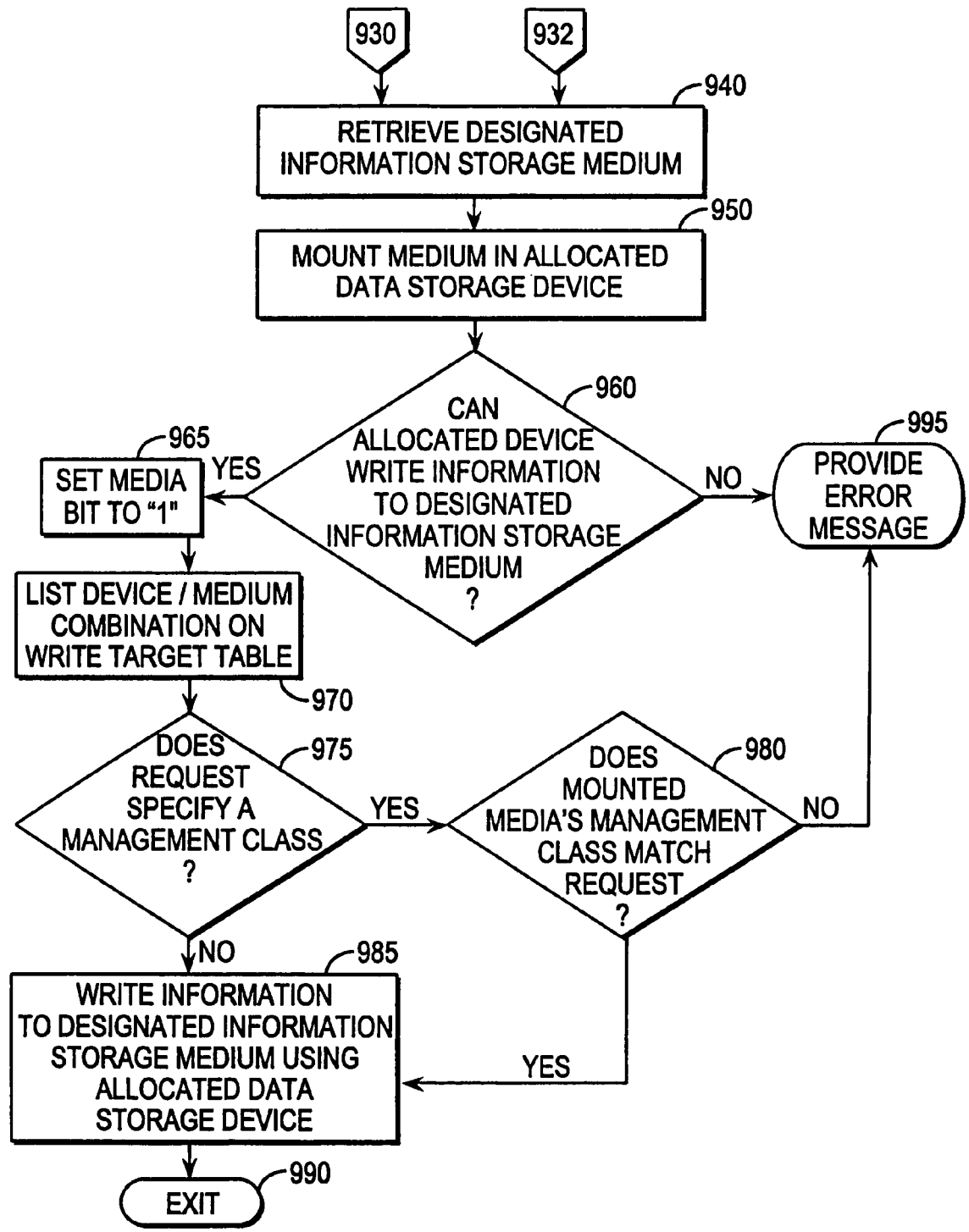
FIG. 9B is a flow chart summarizing additional steps in the method of FIG. 9A.

Applicants' invention further includes a method to write information to a designated information storage medium using an allocated input/output device by accessing and using previously determined and stored device bits and media bits. FIGS. 9A and 9B summarizes the steps of Applicants' method to write information to a designated information storage medium using an allocated input/output device, where that medium and device are disposed in a data storage and retrieval system. The steps of Applicants' method recited in FIGS. 9A and 9B may also be implemented in other computer systems, including personal computers, mainframe computers, work stations, and the like.

Referring now to FIG. 9A, in step 902 a data storage and retrieval system, such as system 100 (FIG. 1)/200 (FIG. 2)/300 (FIG. 3), receives a request from one or more host computers, such as host computer 390 (FIGS. 1, 2, 3, 4), to write information to a designated data storage medium, such as one or more of media 360 (FIG. 3) and/or portable cartridges 370 (FIG. 3), using an allocated input/output device, such as device 130 (FIGS. 1, 2, 3, 4)/140 (FIGS. 1, 2, 3, 4). In step 904, Applicants' method determines whether the device/medium combination requested by the one or more host computers is listed on the system's Write Target Table. In certain embodiments, the Write Target Table is stored in one or more host computers, such as host computer 390 (FIGS. 1, 2, 3, 4). In certain embodiments, the Write Target Table is stored in a storage management program, such as storage management program 310 (FIG. 3). In certain embodiments, the Write Target Table is stored in a library controller, such a controller 160 (FIGS. 1, 2). In certain embodiments, the Write Target Table is stored in one or more accessor control cards, such as accessor control card 250 (FIG. 4).

If the designated information storage medium/allocated input/output device combination is listed on the system's Write Target Table, then Applicants' method transitions to step 905 wherein the designated information storage medium is retrieved by an accessor, such as accessor 110 (FIG. 1)/120 (FIG. 1)/210 (FIG. 2), and transported to the allocated input/output device, such as device 130 (FIGS. 1, 2, 3, 4) or 140 (FIGS. 1, 2, 3, 4). In step 906, the designated information storage medium is mounted in the allocated input/output device.

In step 907, Applicants' method determines if the request of step 902 includes a specified information recording format, i.e. a specified Management Class. For illustrative purposes, assume step 902 comprises a request to write a file entitled, for example, DATA, using a specified information recording format. For example, in certain circumstances legal documents may be stored in softcopy on optical ablative OWORM media and still be considered original documents. By specifying an "OWORM" information recording format, the user can assure that the "original" status of such archived documents is preserved because those documents are necessarily written to the correct information storage medium using the correct information recording technology.

In certain embodiments, the request of step 902 comprises a command to write DATA_XX.txt, where the "XX" feature comprises a Management Class designation which corresponds to a certain information recording format such as 627, 637, and 647, as shown in FIG. 6. In certain embodiments, the request of step 902 comprises DATA.XX.txt, "XX" feature comprises a Management Class designation which corresponds to a certain information recording format. In certain embodiments, the request of step 902 comprises a command to write DATA.XX.YY.txt, wherein two Management Classes are specified. Table I recites examples of requests comprising one or more Management Classes.

TABLE 1

| REQUEST | MANAGEMENT CLASS DESIGNATION(S) |
| --- | --- |
| DATA.R.txt | Data is written using a once-writeable medium |
| DATA.RAM.txt | Data is written to a DVD-RAM medium |
| DATA.OWORM.txt | Data is written to an ablative once-writeable medium |
| DATA.MO.R.txt | Data is written to a magneto-optical, once-writeable medium |
| DATA.MO.RW.txt | Data is written to a magneto-optical, re-writeable medium |
| DATA.PC.R.txt | Data is written to a phase-change, once-writeable medium |
| DATA.PC.RW.txt | Data is written to a phase-change, re-writeable medium |
| DATA.TAPE.txt | Data is written to a tape medium |
| DATA.HDD.txt | Data is written to a hard disk medium |

In the event Applicants' method determines in step 907 that the request of step 902 does not specify a Management Class, then Applicants' method transitions from step 907 to step 909 wherein the information is written to the designated information storage medium. After writing the information to the designated information storage medium in step 909, Applicants' method ends in step 910. If the request of step 902 does specify one or more Management Classes, then Applicants' method transitions from step 907 to step 908 wherein Applicants' method determines if the mounted medium is write capable using the specified one or more Management Classes.

If Applicants' method determines in step 907 that the request of step 902 does specify one or more Management Classes, and if Applicants' method determines in step 908 that the mounted medium matches the specified one or more Management Classes, then Applicants' method transitions to step 909 wherein the information is written to the designated information storage medium using the allocated data storage device using the specified information recording format(s). Alternatively, if Applicants' method determines in step 908 that the mounted medium does not match the specified Management Class, then Applicants' method transitions from step 908 to step 911 wherein an error message is provided.

In certain embodiments, step 911 includes instructing an accessor, such as accessor 110 FIG. 1)/120 (FIG. 1) to retrieve the mounted medium and to replace that medium with an information storage medium that is write capable using the specified one or more Management Classes. In certain embodiments, step 911 includes displaying a prompt to the user to replace the mounted information storage medium with an information storage medium that is write capable using the specified one or more Management Classes.

Referring again to step 904, if the allocated device/designated information storage medium combination requested in step 902 is not listed in the system's Write Target Table, then Applicants' method transitions to step 912 wherein Applicants' method determines if the device bit for the allocated input/output device is 1. In certain embodiments, the determination of step 912 is performed by one or more host computers. In certain embodiments, the determination of step 912 is performed by a storage management program. In certain embodiments, the determination of step 912 is performed by a library controller. In certain embodiments, the determination of step 912 is performed by one or more accessor control cards.

If the device bit for that data storage drive is set to 1, then Applicants' method transitions to step 928. If the device bit for the allocated input/output device has not been set to 1, then Applicants' method transitions to step 914 wherein Applicants' method determines if the device bit for the allocated input/output device is set to 0. In certain embodiments, the determination of step 914 is performed by one or more host computers. In certain embodiments, the determination of step 914 is performed by a storage management program. In certain embodiments, the determination of step 914 is performed by a library controller. In certain embodiments, the determination of step 914 is performed by one or more accessor control cards. If the device bit for the allocated input/output device has been set to 0, then Applicants' method transitions to step 922 wherein an error message is provided.

In certain embodiments, the error message of step 922 is provided by one or more host computers. In certain embodiments, the error message of step 922 is provided by a storage management program. In certain embodiments, the error message of step 922 is provided by a library controller. In certain embodiments, the error message of step 922 is provided by one or more accessor control cards.

In the event Applicants' method determines that a device bit for the allocated input/output device has not been set, i.e. the results of steps 912 and 914 are both "NO," then Applicants' method transitions to step 916 where the write capability of the allocated input/output device is determined.

The determination of step 916 parallels steps 504 (FIG. 5A) and 506 (FIG. 5A). In certain embodiments, the determination of step 916 is performed by one or more host computers. In certain embodiments, the determination of step 916 is performed by a storage management program. In certain embodiments, the determination of step 916 is performed by a library controller. In certain embodiments, the determination of step 916 is performed by one or more accessor control cards.

Based upon the results of step 916, the device bit for the allocated input/output device is either set to 1 in step 924, or to 0 in step 918. That device bit is then stored in either step 920 or 926. In certain embodiments, steps 918/924 are performed by one or more host computers. In certain embodiments, steps 918/924 are performed by a storage management program. In certain embodiments, steps 918/924 are performed by a library controller. In certain embodiments, steps 918/924 are performed by one or more accessor control cards.

In certain embodiments, steps 920/926 are performed by one or more host computers. In certain embodiments, steps 920/926 are performed by a storage management program. In certain embodiments, steps 920/926 are performed by a library controller. In certain embodiments, steps 920/926 are performed by one or more accessor control cards.

In the event the allocated input/output device cannot write information, then an error message is provided in step 922. Alternatively, if the allocated input/output device can write information, then Applicants' method transitions to step 928 from step 926. In step 928, the system determines if the media bit for the designated information storage medium has been set to 1. In certain embodiments, the determination of step 928 is performed by one or more host computers. In certain embodiments, the determination of step 928 is performed by a storage management program. In certain embodiments, the determination of step 928 is performed by a library controller. In certain embodiments, the determination of step 928 is performed by one or more accessor control cards.

If the media bit for the designated information storage medium has previously been set to 1, then Applicants' system determines in step 932 if multiple information storage media/data storage drive types are used in the library. In certain embodiments, the determination of step 932 is performed by one or more host computers. In certain embodiments, the determination of step 932 is performed by a storage management program. In certain embodiments, the determination of step 932 is performed by a library controller. In certain embodiments, the determination of step 932 is performed by one or more accessor control cards.

If the library does not use differing information storage devices/media, then Applicants' method transitions from step 932 to steps 905, 906, 907, 908, 909, 910, and 911, as described above.

If the system determines in step 928 that the media bit for the designated information storage medium has not been set to 1, then Applicants' method transitions from step 928 to step 930 where the system determines if that media bit has been set to 0. In certain embodiments, the determination of step 930 is performed by one or more host computers. In certain embodiments, the determination of step 930 is performed by a storage management program. In certain embodiments, the determination of step 930 is performed by a library controller. In certain embodiments, the determination of step 930 is performed by one or more accessor control cards.

If the media bit has been set to 0, then Applicants' method transitions to step 935 wherein an error message is provided. In certain embodiments, the error message of step 935 is provided by one or more host computers. In certain embodiments, the error message of step 935 is provided by a storage management program. In certain embodiments, the error message of step 935 is provided by a library controller. In certain embodiments, the error message of step 935 is provided by one or more accessor control cards.

If the system determines that the media bit for the designated information storage medium has not been set, i.e. the results of steps 928 and 930 are "NO," then Applicants' method transitions to step to step 940 from step 930. If in step 932 Applicants' method determines that multiple information storage media are used, then Applicants' method transitions to step 940 from step 932.

Referring now to FIG. 9B, in step 940 Applicants' method causes an accessor to retrieve the designated data storage medium 360 or data storage cartridge 370. In certain embodiments, step 940 is performed by one or more host computers. In certain embodiments, step 940 is performed by a storage management program. In certain embodiments, step 940 is performed by a library controller. In certain embodiments, step 940 is performed by one or more accessor control cards.

In step 950, that designated information storage medium is mounted in the allocated input/output device. In step 960, Applicants' method determines if the allocated input/output device can write information to the designated information storage medium. In certain embodiments, the determination of step 960 is performed by one or more host computers. In certain embodiments, the determination of step 960 is performed by a storage management program. In certain embodiments, the determination of step 960 is performed by a library controller. In certain embodiments, the determination of step 960 is performed by one or more accessor control cards.

If the allocated input/output device cannot write information to the designated information storage medium, then Applicants' method transitions from step 960 to step 995 wherein an error message is provided. In certain embodiments, the error message of step 995 is provided by one or more host computers. In certain embodiments, the error message of step 995 is provided by a storage management program. In certain embodiments, the error message of step 995 is provided by a library controller. In certain embodiments, the error message of step 995 is provided by one or more accessor control cards.

Alternatively, if the allocated device can write information to the designated medium, then Applicants' method transitions from step 960 to step 965 wherein the media bit for the designated information storage medium is set to 1. In certain embodiments, step 965 is performed by one or more host computers. In certain embodiments, step 965 is performed by a storage management program. In certain embodiments, step 965 is performed by a library controller. In certain embodiments, step 965 is performed by one or more accessor control cards.

In step 970 the allocated input/output device/designated information storage medium combination is listed on the system's Write Target Table. In certain embodiments, such a Write Target Table is stored in a host computer. In certain embodiments, such a Write Target Table is stored in a storage management program. In certain embodiments, such a Write Target Table is stored in a library controller. In certain embodiments, such a Write Target Table is stored in one or more accessor controllers.

In certain embodiments of Applicants' method, the computer system includes a display device. In certain embodiments, the system includes a visual display device. In certain embodiments, the system's Write Target Table is displayed on the display device/visual display device in response to the computer user invoking either a SAVE command, or a SAVE AS command. In these embodiments, only writeable input/output devices are presented to the user as potential write targets.

In step 975, Applicants' method determines if the request of step 902 includes specifying one or more Management Classes. In the event Applicants' method determines in step 975 that the request of step 902 does not specify a Management Class, then Applicants' method transitions from step 975 to step 985 wherein the information is written to the designated information storage medium and then Applicants' method exists in step 990. If the request of step 902 does specify one or more Management Classes, then Applicants' method transitions from step 975 to step 980 wherein Applicants' method determines if the mounted medium is write capable using the one or more specified Management Classes.

If Applicants' method determines in step 975 that the request of step 902 does specify one or more Management Classes, and if Applicants' method determines in step 980 that the mounted medium matches the one or more specified Management Classes, then Applicants' method transitions to step 985 wherein the information is written to the designated information storage medium using the allocated data storage device using the specified one or more information recording formats. Alternatively, if Applicants' method determines in step 980 that the mounted medium does not match the specified Management Class, then Applicants' method transitions from step 980 to step 995 wherein an error message is provided.

In certain embodiments, step 995 includes instructing an accessor, such as accessor 110 FIG. 1)/120 (FIG. 1) to retrieve the mounted medium and to replace that medium with an information storage medium that is write capable using the one or more specified Management Classes. In certain embodiments, step 995 includes displaying a prompt to the user to replace the mounted information storage medium with an information storage medium that is write capable using the one or more specified information recording formats.

The embodiments of Applicants' method summarized in FIGS. 9A and 9B may be implemented separately. For example, one embodiment may include only the steps of FIG. 9A. In addition, certain steps recited in FIGS. 9A and 9B may be performed, for example, by one or more host computers, while other steps may be performed, for example, by a library controller, while yet other steps may be performed, for example, by one or more accessor control cards. Moreover, in certain embodiments, one or more individual steps of Applicants' method summarized in FIGS. 9A and 9B may be combined, eliminated, or reordered.

Applicants' invention further includes a data storage and retrieval system comprising a computer useable medium having computer readable program code disposed therein for writing information to a designated information storage medium using an allocated input/output device by accessing and using a device bit previously determined for the allocated input/output device and a media bit previously determined for the designated information storage medium.

Applicants' invention further includes a computer program product usable with a programmable computer processor having computer readable program code embodied therein for writing information to a designated information storage medium using an allocated input/output device by accessing and using a device bit previously determined for the allocated input/output device and a media bit previously determined for the designated information storage medium.

Figure 12:
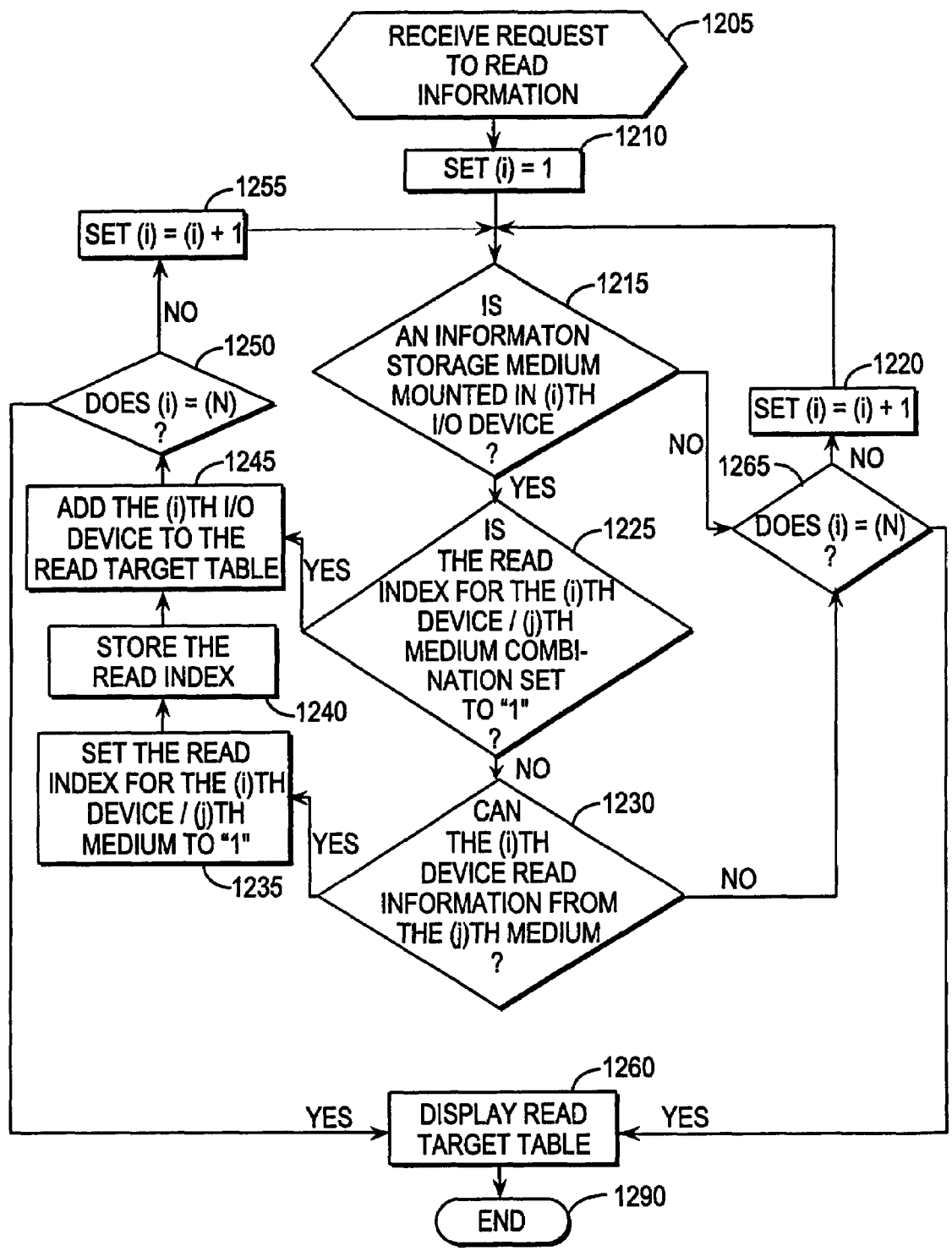
FIG. 12 is a flow chart summarizing the steps of Applicants' method to display a computer system's Read Target Table.

Applicants' invention further includes a method to use one or more previously determined and stored Read Indices to form and display a Read Target Table. Referring now to FIG. 12, step 1205 initiates this embodiment of Applicants' method. In step 1205, for example, a computer system receives a "File Open" command. In certain embodiments of Applicants' invention, the computer system comprises a personal computer. In certain embodiments, the computer system comprises a mainframe computer. In certain embodiments, the computer system comprises a work station. In certain embodiments, the computer system comprises a data storage and retrieval system.

In step 1210, Applicants' method selects a first I/O device, i.e. sets (i)=1. In certain embodiments, step 1210 is performed by one or more host computers. In certain embodiments, step 1210 is performed by one or more host computers. In certain embodiments, step 1210 is performed by a storage management program. In certain embodiments, step 1210 is performed by a library controller. In certain embodiments, step 1210 is performed by one or more accessor control cards.

In step 1215, Applicants' method determines if an information storage medium is mounted in the (i)th I/O device. In certain embodiments, step 1215 is performed by one or more host computers. In certain embodiments, step 1215 is performed by a storage management program. In certain embodiments, step 1215 is performed by a library controller. In certain embodiments, step 1215 is performed by one or more accessor control cards.

If Applicants' method determines in step 1215 that there is no information storage medium mounted in the (i)th I/O device, then Applicants' method transitions from step 1215 to step 1265 wherein Applicants' method determines if all of the (N) I/O devices have been examined, i.e. if (i)=(N). In certain embodiments, step 1265 is performed by one or more host computers. In certain embodiments, step 1265 is performed by a storage management program. In certain embodiments, step 1265 is performed by a library controller. In certain embodiments, step 1265 is performed by one or more accessor control cards.

If Applicants' method determines in step 1265 that (i)=(N), then Applicants' method transitions from step 1265 to step 1260 wherein the computer system's Read Target Table is displayed to the user making the "OPEN FILE" command. In certain embodiments, step 1260 is performed by one or more host computers. In certain embodiments, step 1260 is performed by a storage management program. In certain embodiments, step 1260 is performed by a library controller. In certain embodiments, step 1260 is performed by one or more accessor control cards.

FIG. 10A shows an embodiment of the display of step 1260. In the embodiment of FIG. 10A, in response to the "OPEN FILE" request of step 1205, Applicants' method displays the Read Target Table shown on display device 1000. In the embodiment shown in FIG. 10A, the Read Target Table includes device identifiers for various I/O devices disposed in, or attached to, the computer system. In the embodiment of FIG. 10A, the Read Target Table includes device identifiers for an "a" I/O device, a "c" I/O device, a "d" I/O device, and an "e" I/O device. In certain embodiments, such an "a" I/O device comprises a floppy disk drive. In certain embodiments, such a "c" I/O device comprises a hard disk drive. In certain embodiments, such a "d" I/O device comprises an optical disk, such as a CD-ROM, a DVD-R, and the like. In certain embodiments, such an "e" I/O device comprises a data storage and retrieval system, such as system 100 (FIG. 1). In comparing FIGS. 10A and 10B, the Read Target Table of FIG. 10A need not equal the Write Target Table of FIG. 10B.

Referring again to FIG. 12, if Applicants' method determines in step 1265 that (i) does not equal (N), then Applicants' method transitions from step 1265 to step 1220 wherein (i) is incremented by 1. In certain embodiments, step 1220 is performed by one or more host computers. In certain embodiments, step 1220 is performed by a storage management program. In certain embodiments, step 1220 is performed by a library controller. In certain embodiments, step 1220 is performed by one or more accessor control cards. Applicants' method then transitions from step 1220 to step 1215.

If Applicants' method determines in step 1215 that an information storage medium, i.e. the (j)th information storage medium for example, is mounted in the (i)th I/O device, then Applicants' method transitions from step 1215 to step 1225, wherein Applicants' method determines if a Read Index for the (i)th device in combination with the (j)th medium was previously determined and stored. In certain embodiments, step 1225 is performed by one or more host computers. In certain embodiments, step 1225 is performed by a storage management program. In certain embodiments, step 1225 is performed by a library controller. In certain embodiments, step 1225 is performed by one or more accessor control cards.

If Applicants' method determines in step 1225 that the Read Index for the (i)th device in combination with the (j)th medium was previously set to 1, then Applicants' method transitions from step 1225 to step 1245, wherein the (i)th I/O device is added to the computer system's Read Target Table. In certain embodiments, step 1245 is performed by one or more host computers. In certain embodiments, step 1245 is performed by a storage management program. In certain embodiments, step 1245 is performed by a library controller. In certain embodiments, step 1245 is performed by one or more accessor control cards.

Applicants' method transitions from step 1245 to step 1250, wherein Applicants' method determines if (i)=(N). In certain embodiments, step 1250 is performed by one or more host computers. In certain embodiments, step 1250 is performed by a storage management program. In certain embodiments, step 1250 is performed by a library controller. In certain embodiments, step 1250 is performed by one or more accessor control cards. If Applicants' method determines in step 1250 that (i) does not equal (N), then Applicants' method transitions from step 1250 to step 1255 wherein (i) is set to (i)+1. Applicants' method then transitions from step 1255 to step 1215.

Alternatively, if Applicants' method determines in step 1250 that (i)=(N), then Applicants' method transitions from step 1250 to step 1260 wherein the computer system's Read Target Table is displayed to the user making the "OPEN FILE" command. In certain embodiments, step 1260 is performed as described above by one or more host computers. In certain embodiments, step 1260 is performed as described above by a storage management program. In certain embodiments, step 1260 is performed as described above by a library controller. In certain embodiments, step 1260 is performed as described above by one or more accessor control cards. After step 1260, Applicants' method ends at step 1290.

Alternatively, if Applicants' method determines in step 1225 that the Read Index has not been set to 1, then Applicants' method transitions to step 1230 wherein Applicants' method determines if the (i)th I/O device can read information from the (j)th information storage medium. In certain embodiments, the determination of step 1230 is performed by one or more host computers. In certain embodiments, the determination of step 1230 is performed by a storage management program. In certain embodiments, the determination of step 1230 is performed by a library controller. In certain embodiments, the determination of step 1230 is performed by one or more accessor controllers.

If Applicants' method determines in step 1230 that the (i)th device cannot read information from the (j)th medium, then Applicants' method transitions from step 1230 to step 1265. Alternatively, if Applicants' method determines in step 1230 that the (i)th device can read information from the (j)th medium, then Applicants' method transitions from step 1230 to step 1235 wherein the Read Index for the (i)th device/(j)th medium combination is set to 1. In certain embodiments, step 1235 is performed by one or more host computers. In certain embodiments, step 1235 is performed by a storage management program. In certain embodiments step 1235 is performed by a library controller. In certain embodiments, step 1235 is performed by one or more accessor controllers.

Applicants' method transitions from step 1235 to step 1240 wherein Applicants' method stores the Read Index of step 1235. In certain embodiments, step 1240 is performed by one or more host computers. In certain embodiments, step 1240 is performed by a storage management program. In certain embodiments, step 1240 is performed by a library controller. In certain embodiments, step 1240 is performed by one or more accessor controllers. Applicants' method transitions from step 1170 to step 1240. Applicants' method transitions from step 1240 to step 1245.

The embodiments of Applicants' method summarized in FIG. 12 may be implemented separately. In addition, certain steps recited in FIG. 12 may be performed, for example, by one or more host computers, while other steps may be performed, for example, by a library controller, while yet other steps may be performed, for example, by one or more accessor control cards. Moreover, in certain embodiments, one or more individual steps of Applicants' method summarized in FIG. 12 may be combined, eliminated, or reordered.

Applicants' invention further includes a data storage and retrieval system comprising a computer useable medium having computer readable program code disposed therein for forming and displaying a Read Target Table in response to a request to open a file.

Applicants' invention further includes a computer program product usable with a programmable computer processor having computer readable program code embodied therein for forming and displaying a Read Target Table.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to determine the write capability of the (i)th input/output device disposed in a computer system in combination with the (j)th information storage medium disposed in said computer system, wherein said computer system comprises (N) input/output devices and (M) information storage media, wherein said computer system has (N) device bits stored therein and (M) media bits stored therein, and wherein each of said (N) device bits is assigned to a different one of said (N) input/output devices and each of said (M) media bits is assigned to a different one of said (M) information storage media, and wherein (i) is an integer greater than or equal to 1 and less than or equal to (N), and wherein (j) is an integer greater than or equal to 1 and less than or equal to (M), comprising the steps of:
 (a) setting (i) equal to 1;
 (b) selecting the (i)th input/output device;
 (c) disposing a reference information storage medium in said (i)th input/output device and testing said (i)th input/output device to determine if that (i)th input/output device can write information;
 (d) operative if said (i)th input/output device can write information, setting the (i)th device bit to 1;
 (e) operative if said (i)th input/output device cannot write information, setting the (i)th device bit to 0;
 (f) storing said (i)th device bit;
 (g) determining if (i)=(N); and
 (h) if (i) is less than (N), setting (i) equal to (i)+1 and repeating steps (b), (c), (d), (e), (f), (g), and (h);
 (i) setting (j) equal to 1;
 (j) selecting the (j)th information storage medium;
 (k) disposing said (j)th information storage medium in a reference input/output device and testing said (j)th information storage medium to determine if that (j)th information storage medium is writeable;
 (l) operative if said (j)th information storage medium is writeable, setting the (j)th media bit to 1;
 (m) operative if said (j)th information storage medium is not writeable, setting the (j)th media bit to 0; and
 (n) storing said (j)th media bit;
 (o) determining if (j)=(M); and
 (p) if (j) is less than (M), setting (j) equal to (j)+1 and repeating steps (j), (k), (l), (m), (n), (o), and (p).

2. The method of claim 1, further comprising the step of: forming one or more (i)th(j)th Recording Index, whereby each (i)th(j)th Recording Index is formed by multiplying the (i)th device bit times the (j)th media bit; and storing each of said one or more (i)th(j)th Recording Index.

3. The method of claim 2, wherein said computer system comprises a display device, comprising the step of displaying each Recording Index having a value of 1.

4. The method of claim 2, wherein said computer system further comprises a Write Target Tables comprising the step of adding the (i)th device in combination with the (j)th information storage medium to said Write Target Table if the (i)th(j)th Recording Index equals 1.

5. The method of claim 4, wherein said computer system further comprises a display device, comprising the step of displaying said Write Target Table on said display device.

6. The method of claim 1, wherein said computer system further includes one or more accessors, and wherein said (M) information storage media are moveably disposed within said computer system, and wherein said computer system is capable of communication with one or more host computers.

7. A computer system comprising a computer useable medium having computer readable program code disposed therein to determine the write capability of the (i) th input/output device disposed therein in combination with the (j)th information storage medium disposed therein, wherein said computer system further comprises (N) input/output devices and (M) information storage media, wherein said computer system has (N) device bits stored therein and (M) media bits stored therein, and wherein each of said (N) device bits is assigned to a different one of said (N) input/output devices and each of said (M) media bits is assigned to a different one of said (M) information storage media, and wherein (i) is an integer greater than or equal to 1 and less than or equal to (N), and wherein (j) is an integer greater than or equal to 1 and less than or equal to (M), the computer readable program code comprising a series of computer readable program steps that are executed to effect:

(a) setting (i) equal to 1;
(b) selecting the (i)th input/output device;
(c) disposing a reference information storage medium in said (i)th input/output device and testing said (i)th input/output device to determine of that (i)th input/output device can write information;
(d) operative if said (i)th input/output device can write information, setting the (i)th device bit to 1;
(e) operative if said (i)th input/output device cannot write information, setting the (i)th device bit to 0;
(f) storing said (i)th device bit;
(g) determining if (i)=(N); and
(h) if (i) is less than (N), setting (i) equal to (i)+1 and repeating steps (b), (c), (d), (e), (f), (g), and (h);
(i) setting (j) equal to 1;
(j) selecting the (j)th information storage medium;
(k) disposing said (j)th information storage medium in a reference input/output device and testing said (j)th information storage medium to determine if that (j)th information storage medium is writeable;
(l) operative if said (j)th information storage medium is writeable, setting the (j)th media bit to 1;
(m) operative if said (j)th information storage medium is not writeable, setting the (j)th media bit to 0; and
(n) storing said (j)th media bit;
(o) determining if (j)=(M); and
(p) if (j) is less than (M), setting (j) equal to (j)+1 and repeating steps (j), (k), (l), (m), (n), (o), and (p).

8. The computer system of claim 7, said computer readable program code further comprising a series of computer readable program steps to effect:

forming a one or more (i)th(j)th Recording Index, whereby each (i)th(j)th Recording Index is formed by multiplying the (i)th device bit times the (j)th media bit; and storing each of said one or more (i)th(j)th Recording Index.

9. The computer system of claim 8, further comprising a display device, said computer readable program code further comprising a series of computer readable program steps to effect displaying each of said one or more (i)th(j)th Recording Index having a value of 1.

10. The computer system of claim 9, further comprising a Write Target Table, said computer readable program code further comprising a series of computer readable program steps to effect adding the (i)th device in combination with the (j)th information storage medium to said Write Target Table if the (i)th/(j)th Recording Index equals 1.

11. The computer system of claim 10, further comprising a display device, said computer readable program code further comprising a series of computer readable program steps to effect displaying said Write Target Table on said display device.

12. A computer program product embodied in a computer readable medium disposed in a computer system, said computer program product being usable with a programmable computer processor for determining the write capability of (N) input/output devices and (M) portable information storage media disposed therein, wherein said computer system has (N) device bits stored therein and (M) media bits stored therein, and wherein each of said (N) device bits is assigned to a different one of said (N) input/output devices and each of said (M) media bits is assigned to a different one of said (M) information storage media, comprising:

computer readable program code which when executed, causes said programmable computer processor to set (i)=1;

computer readable program code which when executed, causes said programmable computer processor to determine if (i)=(N);

computer readable program code which when executed, causes said programmable computer processor to sequentially increment (i) by 1 if (i)<(N), until (i)=(N);

computer readable program code which when executed, causes said programmable computer processor to dispose a reference information storage medium in said (i)th input/output device and testing said (i)th input/output device to determine for each value of (i) if the (i)th input/output device can write information;

computer readable program code which when executed, causes said programmable computer processor to set, for each value of (i), the (i)th device bit to 1 if the (i)th input/output device can write information;

computer readable program code which when executed, causes said programmable computer processor to set, for each value of (i), the (i)th device bit to 0 if the (i)th input/output device cannot write information;

computer readable program code which when executed, causes said programmable computer processor to store the (i)th device bit;

computer readable program code which when executed, causes said programmable computer processor to set (j)=1;

computer readable program code which when executed, causes said programmable computer processor to determine if (j)=(M);

computer readable program code which when executed, causes said programmable computer processor to sequentially increment (j) by 1 if (j)<(M) until (j)=(M);

computer readable program code which when executed, causes said programmable computer processor to dispose said (j)th information storage medium in a reference input/output device and test said (j)th information storage medium to determine for each value of (j) if the (j)th information storage medium is writeable;

computer readable program code which when executed, causes said programmable computer processor to set, for each value of (j), the media bit for the (j)th information storage medium to 1 if the (j)th information storage medium is writeable;

computer readable program code which when executed, causes said programmable computer processor to set, for each value of (j), the media bit for the (j)th information storage medium to 0 if the (j)th information storage medium is not writeable; and computer readable program code which when executed, causes said programmable computer processor to store said (j)th media bit.

13. The computer program product of claim 12, wherein said computer system comprises a display device, further comprising:
  computer readable program code which when executed, causes said programmable computer processor to display on said display device each of said (N) input/output devices having a device bit set to 1.

14. The computer program product of claim 12, further comprising:
  computer readable program code which when executed, causes said programmable computer processor to create one or more (i)th(j)th Recording Index, wherein each (i)th(j)th Recording Index is formed by multiplying the (i)th device bit times the (j)th media bit; and
  computer readable program code which when executed, causes said programmable computer processor to store each of said one or more (i)th/(j)th Recording Index.

15. The computer program product of claim 14, wherein said computer system comprises a display device, further comprising:
  computer readable program code which when executed, causes said programmable computer processor to display the (i)th/(j)th Recording Index, if said (i)th/(j)th Recording Index equals 1.

16. The computer program product of claim 15, wherein said computer system further comprises a Write Target Table, further comprising:
  computer readable program code which when executed, causes said programmable computer processor to add the (i)th/(j)th Recording Index to said Write Target Table, if said (i)th/(j)th Recording Index equals 1.

* * * * *